US012658952B2

(12) United States Patent (10) Patent No.: US 12,658,952 B2
Gunturi et al. (45) Date of Patent: Jun. 16, 2026

(54) SIGNAL PROFILE BASED DATA CAPTURE FOR DIGITAL PRE-DISTORTION CORRECTION

(71) Applicant: TEXAS INSTRUMENTS INCORPORATED, Dallas, TX (US)

(72) Inventors: Sarma Sundareswara Gunturi, Bangalore (IN); Nishant Kumar, Bangalore (IN); Chandrasekhar Sriram, Bangalore (IN); Jawaharlal Tangudu, Bangalore (IN); Ram Narayan Krishna Nama Mony, Bangalore (IN); Varun Padavu Devaraj, Bangalore (IN); Sashidharan Venkatraman, Bangalore (IN); Pankaj Gaur, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/645,599

(22) Filed: Apr. 25, 2024

(65) Prior Publication Data

US 2024/0364374 A1 Oct. 31, 2024

(30) Foreign Application Priority Data

Apr. 27, 2023 (IN) .............................. 202341030533

(51) Int. Cl.
*H04B 1/04* (2006.01)
(52) U.S. Cl.
CPC ... *H04B 1/0475* (2013.01); *H04B 2001/0408* (2013.01)
(58) Field of Classification Search
CPC .......... H04B 1/0475; H04B 2001/0408; H04B 2001/0425

USPC ..................................................... 375/295–299
See application file for complete search history.

(56) References Cited

U.S. PATENT DOCUMENTS

| | | | | |
|---|---|---|---|---|
| 6,141,390 A | * | 10/2000 | Cova ..................... | H03F 1/3247 |
| | | | | 332/162 |
| 8,229,025 B1 | * | 7/2012 | Summerfield ........ | H04L 27/368 |
| | | | | 455/501 |
| 8,299,025 B2 | * | 10/2012 | Alessi ................... | A61K 47/32 |
| | | | | 514/6.9 |
| 9,287,833 B2 | * | 3/2016 | Peroulas ................ | H03F 3/195 |

(Continued)

FOREIGN PATENT DOCUMENTS

GB      2527816 A  *  1/2016  ............. H03F 3/245

OTHER PUBLICATIONS

Texas Instruments, "AFE77xxD Quad/Dual-Channel RF Transceiver With Dual Feedback Paths Integrating CFR/DPD," SBASAG3A—Jul. 2023, Revised Oct. 2023, 12 pages.

*Primary Examiner* — Emmanuel Bayard
(74) *Attorney, Agent, or Firm* — Xianghui Huang; Frank D. Cimino

(57) ABSTRACT

A circuit includes a capture subsystem and digital pre-distortion (DPD) circuitry. The capture subsystem is configured to capture a set of signal samples responsive to a capture enable signal. The DPD circuitry is configured to generate a signal statistics signal based on an input signal, generate a set of DPD coefficients based on the set of signal samples, and apply DPD correction to the input signal to produce an output signal based on the signal statistics signal and the set of DPD coefficients. The set of signal samples includes samples of the signal statistics signal.

29 Claims, 14 Drawing Sheets

(56)                    References Cited

U.S. PATENT DOCUMENTS

| | | | | |
|---|---|---|---|---|
| 10,931,238 B2 * | 2/2021 | Megretski | ............... | H03F 1/025 |
| 11,171,614 B2 * | 11/2021 | Megretski | ............. | H03F 1/3258 |
| 11,251,819 B1 | 2/2022 | Zhao | | |
| 2002/0080891 A1 * | 6/2002 | Ahn | ...................... | H03F 1/3247 |
| | | | | 375/297 |
| 2010/0020900 A1 | 1/2010 | Cai | | |
| 2014/0333377 A1 * | 11/2014 | Peroulas | ............... | H04L 27/367 |
| | | | | 330/149 |

\* cited by examiner

300

302 — MONITOR AN INPUT SIGNAL

304 — SCHEDULE ONE OR MORE CAPTURE INSTANTS BASED ON THE MONITORING OF THE INPUT SIGNAL

306 — CAPTURE SAMPLES OF THE INPUT SIGNAL, AN OUTPUT SIGNAL, A FEEDBACK SIGNAL, AND A SIGNAL STATISTICS SIGNAL DURING THE ONE OR MORE SCHEDULED CAPTURE INSTANTS

308 — APPLY DPD CORRECTION TO THE INPUT SIGNAL TO PRODUCE THE OUTPUT SIGNAL BASED ON THE CAPTURED SAMPLES

800

802 ～ CATEGORIZE BLOCK POWERS
ACCORDING TO SUB-RANGES

804 ～ SORT BLOCK POWERS IN DESCENDING ORDER
OF POWER IN EACH POWER SUB-RANGE

806 ～ RECORD FRAME DURATION COUNTER
TIMESTAMPS FOR BLOCK POWERS BASED ON
A PROGRAMMABLE NUMBER OF CAPTURES

808 ～ COLLATE THE CAPTURE TIME INSTANTS
ACROSS THE DESIRED POWER SUB-RANGES

SIGNAL PROFILE BASED DATA CAPTURE FOR DIGITAL PRE-DISTORTION CORRECTION

CROSS-REFERENCE TO RELATED APPLICATION

This Application claims the benefit of India provisional application 202341030533, filed on Apr. 27, 2023, the contents of which are hereby incorporated by reference in their entirety.

BACKGROUND

A transmit (Tx) signal chain may include a power amplifier to amplify low power radio frequency (RF) signals. For example, a base station may include a Tx chain with a power amplifier to transmit cellular signals.

SUMMARY

A circuit includes a capture subsystem and digital pre-distortion (DPD) circuitry. The capture subsystem is configured to capture a set of signal samples responsive to a capture enable signal. The DPD circuitry is configured to generate a signal statistics signal based on an input signal, and generate a set of DPD coefficients based on the set of signal samples. The set of signal samples includes samples of the signal statistics signal. The DPD circuitry is further configured to apply DPD correction to the input signal to produce an output signal based on the signal statistics signal and the set of DPD coefficients.

A circuit includes DPD circuitry and a signal capture circuit. The signal capture circuit includes a transmit (Tx) signal profiler, a capture instants finder and scheduler, and a capture subsystem. The DPD circuitry includes a DPD estimator and a signal statistics circuit. The DPD circuitry is configured to apply, based on a set of DPD coefficients, DPD correction to an input signal received on an input of the DPD circuitry to produce an output signal at an output of the DPD circuitry. The Tx signal profiler is coupled to the input of the DPD circuitry and configured to monitor the input signal. The capture instants finder and scheduler is coupled to the Tx signal profiler and configured to provide a capture enable signal based on the monitoring of the input signal. The capture subsystem is coupled to the capture instants finder and scheduler and configured to capture samples of a set of signals responsive to the capture enable signal. The DPD estimator is coupled to the capture subsystem and configured to generate the set of DPD coefficients based on the captured samples. The signal statistics circuit is configured to generate a signal statistics signal based on the input signal, where the set of signals includes the signal statistics signal.

An apparatus includes a DPD circuitry, a signal capture circuit, a digital to analog converter (DAC), a power amplifier, and an analog to digital converter (ADC). The signal capture circuit includes a Tx signal profiler, a capture instants finder and scheduler, and a capture subsystem. The DPD circuitry includes a DPD estimator, and a signal statistics circuit. The DPD circuitry is configured to apply, based on a set of DPD coefficients, DPD correction to an input signal received on an input of the DPD circuitry to produce an output signal at an output of the DPD circuitry. The Tx signal profiler is coupled to the input of the DPD circuitry and configured to monitor the input signal. The capture instants finder and scheduler is coupled to the Tx signal profiler and configured to provide a capture enable signal based on the monitoring of the input signal. The capture subsystem is coupled to the capture instants finder and scheduler and configured to capture samples of a set of signals responsive to the capture enable signal. The DAC has an input coupled to the output of the DPD circuitry, and an output. The power amplifier has an input coupled to the output of the DAC, and an output. The ADC has an input coupled to the output of the power amplifier, and an output coupled to the capture subsystem. The DPD estimator is coupled to the capture subsystem and configured to generate the set of DPD coefficients based on the captured samples. The signal statistics circuit is configured to generate a signal statistics signal based on the input signal. The set of signals includes the input signal, the output signal, an output feedback signal received from the output of the ADC, and the signal statistics signal.

A circuit includes DPD circuitry and a signal capture circuit. The DPD circuitry has an input. The signal capture circuit includes a Tx signal profiler coupled to the input of the DPD circuitry, a capture instants finder and scheduler coupled to the Tx signal profiler, and a capture subsystem coupled to the capture instants finder and scheduler.

DETAILED DESCRIPTION

The drawings are not drawn to scale.

A power amplifier (PA) may be used in a transmit (Tx) signal chain to amplify low power radio frequency (RF) signals. For example, a base station includes a Tx signal chain with a PA for transmitting cellular signals. The base station may transmit cellular signals to a user equipment (UE), which may be a smartphone, laptop, tablet, or other type of device with cellular capabilities. The base station and the UE may operate in accordance with a cellular standard, such as 4th generation (4G) long-term evolution (LTE), 5th generation (5G) new radio (NR), or the like.

A base station can implement techniques such as beamforming and massive multiple-input multiple-output (MIMO) to increase data throughput and reliability when communicating with the UE. In order to implement such techniques, the base station may include a large number of antenna elements, and consequently, a large number of Tx chains. To compensate for increased power draw from the large number of Tx chains, increasing the power efficiency of the Tx chains may be desired. For example, the power efficiency of the PA within the Tx chain may be increased by using Gallium Nitride (GaN) technology. A GaN device may be more power efficient than a comparable silicon device due to the larger bandgap of GaN relative to silicon. However, a GaN PA may experience effects such as electron trapping and de-trapping (e.g., within the GaN material), which can cause distortion at the output of the GaN PA. The present description provides solutions for determining capture time instants to capture digital pre-distortion (DPD) data used to apply DPD correction and compensate for such effects.

Figure 1:
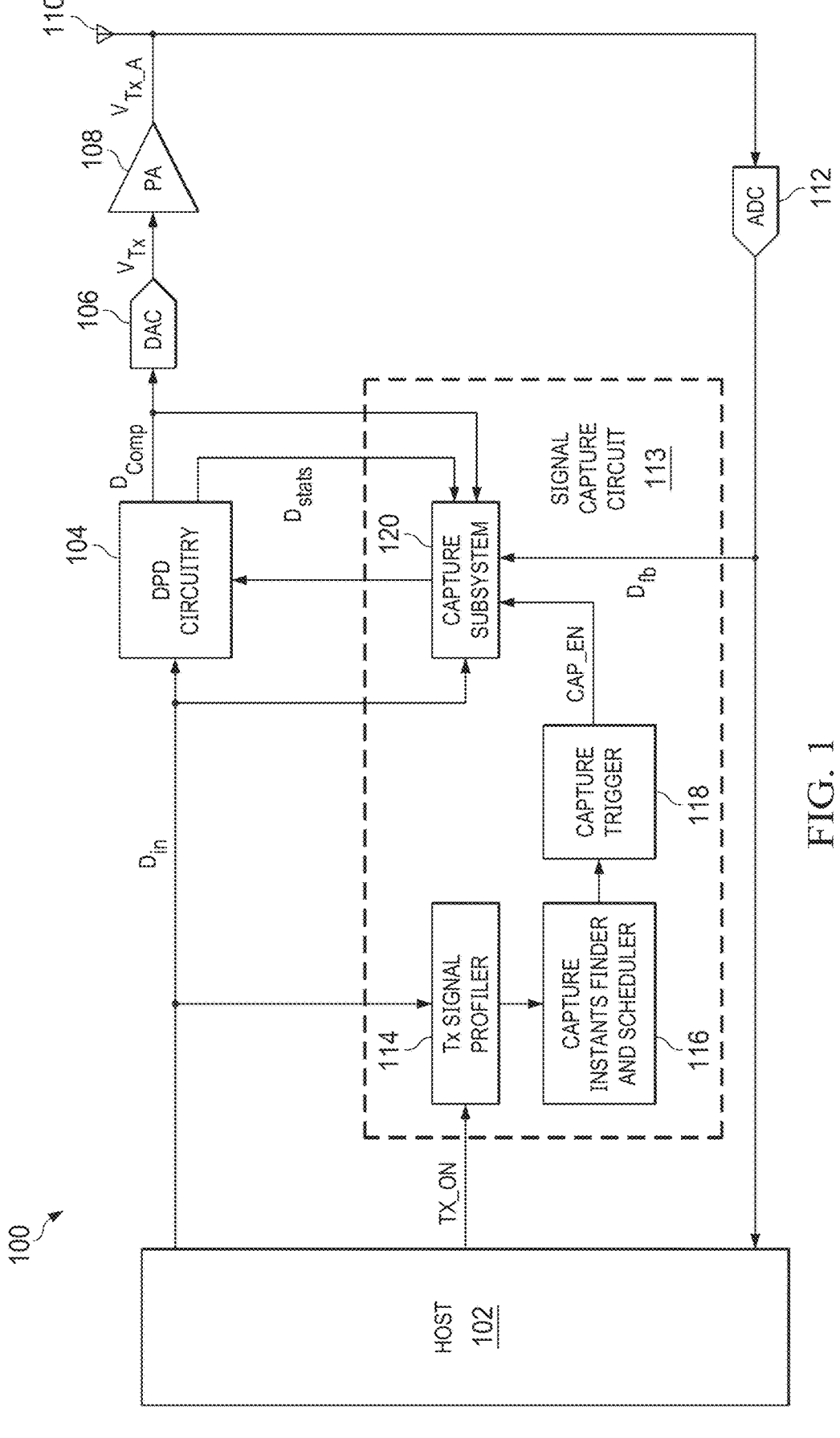
FIG. 1 is a block diagram illustrating an example of a transmit (Tx) signal chain including digital pre-distortion (DPD) circuitry and a signal capture circuit for performing DPD correction.

FIG. 1 illustrates an example circuit 100 of a Tx signal chain including a HOST 102, DPD circuitry 104, a digital to analog converter (DAC) 106, a PA 108, an antenna 110, an analog to digital converter (ADC) 112, and a signal capture circuit 113. As shown, the signal capture circuit 113 includes a Tx signal profiler 114, a capture instants finder and scheduler 116, a capture trigger 118, and a capture subsystem 120. In some examples, the circuit 100 is included in a Tx signal chain or path (e.g., of a base station). In some examples, the Tx signal profiler 114 is implemented in hardware (e.g., digital logic circuitry), while the capture instants finder and scheduler 116 is implemented in hardware and/or software (e.g., instructions executable by a processor). Alternatively, the Tx signal profiler 114 may be implemented in software only, or a combination of hardware and software. In some examples, the Tx signal profiler 114, the capture instants finder and scheduler 116, the capture trigger 118, the capture subsystem 120, and the DPD circuitry 104 are included on a same semiconductor substrate or "chip". Alternatively, the DPD circuitry 104 can be included on a different chip.

The HOST 102 has a first output upon which a signal $D_{in}$ is provided, a second output upon which a signal TX_ON is provided, and an input. The DPD circuitry 104 has a first input, a second input, a first output upon which a signal $D_{comp}$ is provided, and a second output upon which a signal $D_{stats}$ is provided. The Tx signal profiler 114 has a first input, a second input, and an output. As shown, each of the DAC 106, the PA 108, the ADC 112, the capture instants finder and scheduler 116, and the capture trigger 118 has an input and an output. The DAC 106 provides a signal $V_{Tx}$ at its output, the PA 108 provides a signal $V_{Tx\_A}$ at its output, the ADC 112 provides a signal $D_{fb}$ at its output, and the capture trigger provides a signal CAP_EN at its output. The capture subsystem 120 has a first input, a second input, a third input, a fourth input, a fifth input, and an output.

As shown, the first input of the DPD circuitry 104 is coupled to the first output of the HOST 102, and the first output of the DPD circuitry 104 is coupled to the input of the DAC 106. The output of the DAC 106 is coupled to the input of the PA 108. The output of the PA 108 is coupled to the input of the ADC 112 and the antenna 110. The output of the ADC 112 is coupled to the input of the HOST 102.

The first input of the Tx signal profiler 114 is coupled to the first output of the HOST 102, and the second input of the Tx signal profiler 114 is coupled to the second output of the HOST 102. The input of the capture instants finder and scheduler 116 is coupled to the output of the Tx signal profiler 114, and the output of the capture instants finder and scheduler 116 is coupled to the input of the capture trigger 118. The first input of the capture subsystem 120 is coupled to the input of the DPD circuitry 104 (e.g., coupled to the first output of the HOST 102), the second input of the capture subsystem 120 is coupled to the first output of the DPD circuitry 104, the third input of the capture subsystem 120 is coupled to the output of the ADC 112, the fourth input of the capture subsystem 120 is coupled to the second output of the DPD circuitry 104, and the fifth input of the capture subsystem 120 is coupled to the output of the capture trigger 118. Accordingly, the first, second, third, fourth, and fifth inputs of the capture subsystem receive the signals $D_{in}$, $D_{comp}$, $D_{fb}$, $D_{stats}$, and CAP_EN respectively. In some examples, the ADC 112 is referred to as a feedback ADC, providing the signal $D_{fb}$ based on feedback from the PA 108. The output of the capture subsystem is coupled to the second input of the DPD circuitry 104.

In the illustrated example, the HOST 102 is configured to provide the input signal $D_{in}$ (e.g., a digital signal) to the Tx signal chain. In one example, the HOST 102 is a processor, such as a digital signal processor (DSP) operating as a central processing unit (CPU). The signal $D_{in}$ propagates through the signal chain, undergoing DPD correction by the DPD circuitry 104 to produce the pre-distorted signal $D_{comp}$. The signal $D_{comp}$ is digital to analog converted by the DAC 106 to produce the signal $V_{Tx}$. The signal $V_{Tx}$ is then amplified by the PA 108 to produce the signal $V_{Tx\_A}$, which is transmitted via the antenna 110.

In some examples, the response of the PA 108 is non-linear. For example, the power of the signal $V_{Tx\_A}$ output by the PA 108 varies non-linearly with respect to the power of the signal $V_{Tx}$ received on the input of the PA 108. The non-linearity of the PA 108 is pre-compensated in the digital domain using the DPD circuitry 104, for example, by applying the DPD correction to the input signal $D_{in}$ to produce the pre-distorted signal $D_{comp}$. The DPD circuitry 104 applies the DPD correction based on information received from the signal capture circuit 113. For example, the signal capture circuit 113 captures samples of the signals $D_{in}$, $D_{comp}$, $D_{fb}$, $D_{stats}$ at various points in time, and provides the captured samples to the DPD circuitry 104. The DPD circuitry 104 may generate a set of DPD coefficients based on the captured samples, and apply the DPD correction based on the set of DPD coefficients. The pre-distorted signal $D_{comp}$ and the non-linearity of the PA 108 effectively cancel with one another resulting in the signal $V_{Tx\_A}$ that varies linearly with respect to the signal $D_{in}$. In some examples, $D_{comp}$ is referred to as a compensated signal, since it is pre-compensated to cancel with the non-linearity of the PA 108. In some examples, the PA 108 is a GaN PA. Although the PA 108 will generally be referred to as a GaN PA in the present description, other suitable types of semiconductors (e.g., silicon) may also be used.

Some aspects of the present description lie in the appreciation that electron trapping and de-trapping may occur within the GaN material of the PA 108, resulting in further non-linearity effects when compared to alternative types (e.g., silicon, LDMOS, GaAs, etc.) of PAs. For example, variations in the power of the signal $V_{Tx}$ can produce transients in the gain response of the GaN PA due to the electron trapping/de-trapping effects. Further, when the GaN PA transitions from OFF to ON, the GaN PA may experience transient effects (e.g., due to the electron trapping/de-trapping), which can degrade metrics such as error vector magnitude (EVM) and adjacent channel leakage ratio (ACLR). Such transient effects are particularly relevant when using time division duplex (TDD) in cellular communications, where the base station alternates between Tx and receive (Rx) over time, causing the PA 108 to alternate between ON and OFF. Additionally, transient effects may also occur during frequency division duplex (FDD) operation, for example, due to variations in the power of the signal $V_{Tx}$.

Accordingly, to compensate for the non-linearity of the PA 108 caused by electron trapping/de-trapping effects, the signal capture circuit 113 includes the Tx signal profiler 114, and the capture instants finder and scheduler 116. The Tx signal profiler 114 is configured to monitor the input signal $D_{in}$. The capture instants finder and scheduler 116, which is coupled to the Tx signal profiler 114, is configured to schedule one or more capture instants based on the monitoring of the signal $D_{in}$.

In some examples, monitoring the input signal $D_{in}$ includes monitoring a power of the signal $D_{in}$ over time, and/or monitoring a Tx state associated with $D_{in}$. For example, the Tx signal profiler 114 monitors and calculates signal power(s) of $D_{in}$ over time, and stores the calculated power values in a memory of the Tx signal profiler 114. Furthermore, the Tx signal profiler may monitor the TX_ON signal (received from the HOST 102) and log state transitions of the TX_ON signal in the memory. The TX_ON signal, for example, indicates whether the Tx chain is in a Tx mode (e.g., TX_ON='true') or Rx mode (e.g., TX_ON='false').

In some examples, the capture instants finder and scheduler 116 is configured to schedule the one more capture instants based on the data stored in the memory of the Tx signal profiler 114. For example, the capture instants finder and schedule 116 schedules the capture instants at times where the PA 108 will likely experience non-linearity (e.g., during variations in power and/or during transitions between Tx/Rx). As mentioned above, conditions such as variations in the power of $D_{in}$ or transitions between Tx/Rx may cause electron trapping/de-trapping effects within the GaN material, resulting in PA non-linearity. By scheduling the capture instants during these times, the capture subsystem 120 can capture useful data for estimating such PA non-linearity.

During the scheduled capture instants, the capture trigger 118, which is coupled to the capture instants finder and scheduler 116, provides the signal CAP_EN (e.g., with a value of 'true'). Responsive to the signal CAP_EN, the capture subsystem 120 captures samples of one or more signals. In the illustrated example, the one or more signals include the signals $D_{in}$, $D_{comp}$, $D_{fb}$, and $D_{stats}$. The capture subsystem 120 may include one or more memories for storing the captured samples. The capture subsystem 120 provides the captured samples to the DPD circuitry 104, which may generate a set of DPD coefficients based on the captured samples. The set of DPD coefficients may then be used by the DPD circuitry 104 to apply the DPD correction to $D_{in}$ to produce $D_{comp}$.

Figure 2:
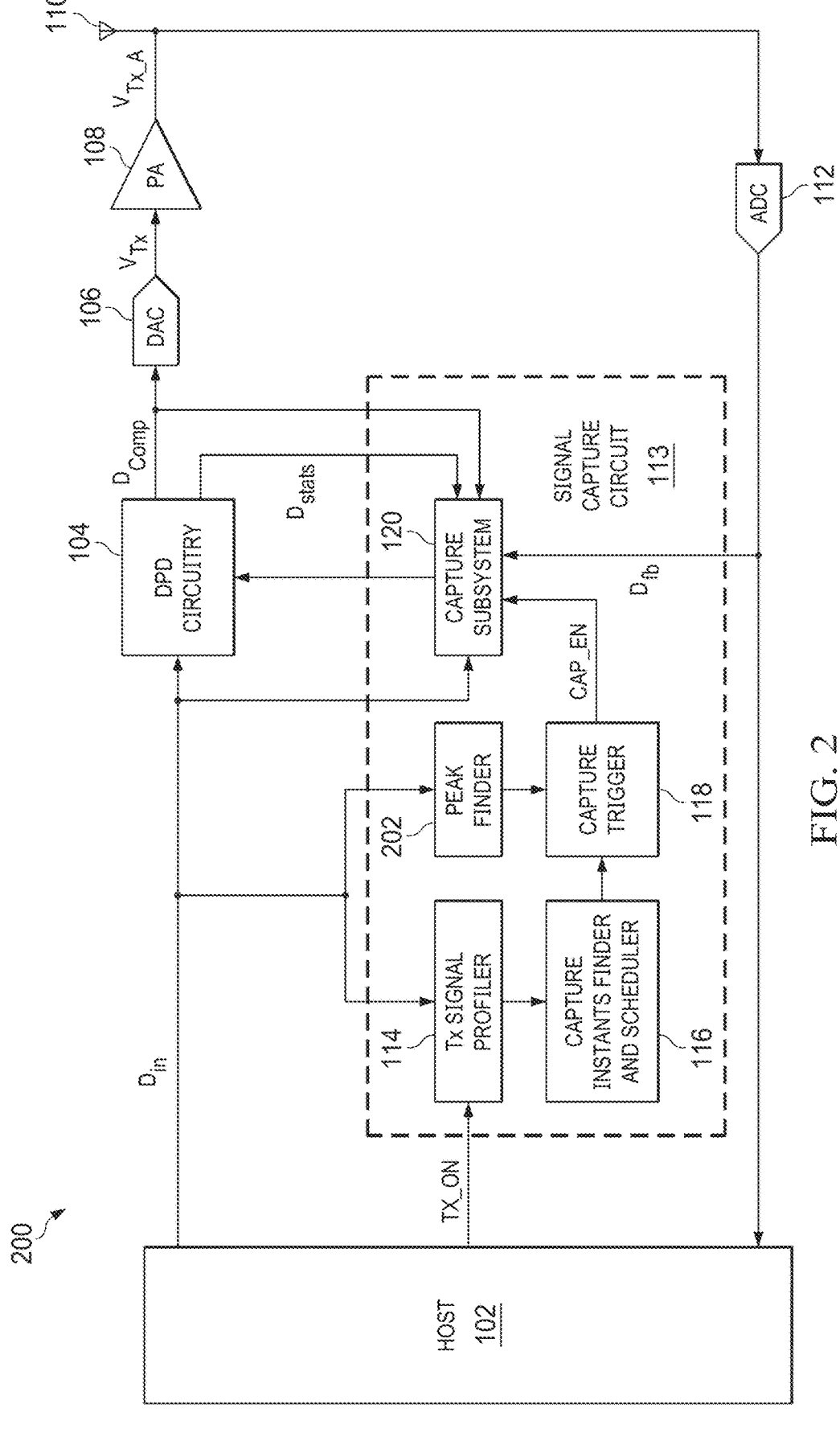
FIG. 2 is a block diagram illustrating the Tx signal chain of FIG. 1, further including a peak finder.

FIG. 2 illustrates an example circuit 200 of a Tx signal chain. The circuit 200 resembles the circuit 100 of FIG. 1, but differs in that the circuit 200 further includes a peak finder 202.

The peak finder 202 has an input coupled to the first output of the HOST 102, and an output. Similar to FIG. 1, the capture trigger 118 has a first input coupled to the output of the capture instants finder and scheduler 116 (e.g., similar to FIG. 1). The capture trigger 118 further has a second input coupled to the output of the peak finder 202.

In some examples, the peak finder 202 is configured to detect peaks (e.g., local maxima) in the signal $D_{in}$, and provide a signal to the capture trigger 118 when a peak is detected. Then, the capture trigger 118 provides the signal CAP_EN, which causes the capture subsystem 120 to capture the signal samples.

Figure 3:
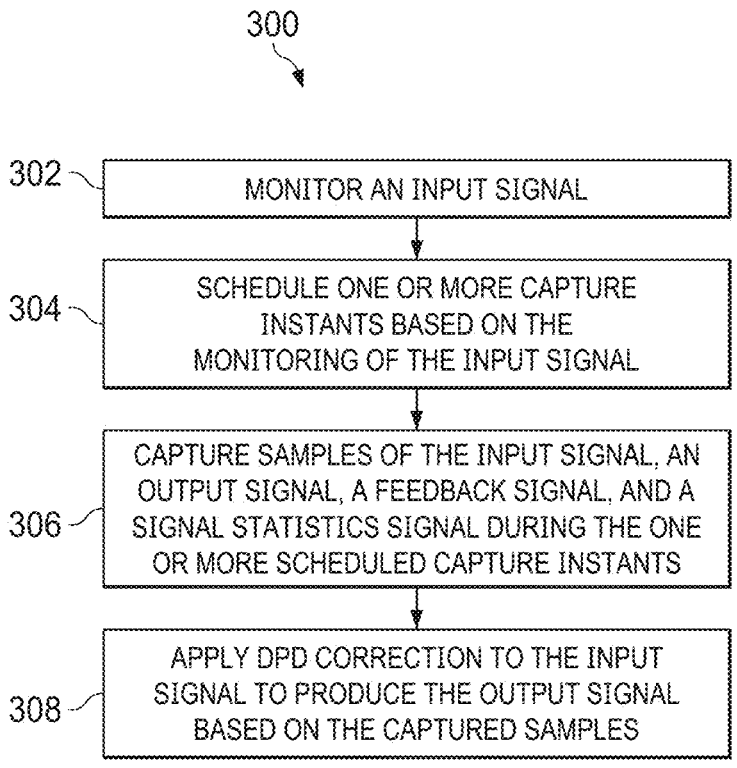
FIG. 3 is a flow diagram illustrating an example method for performing DPD correction.

FIG. 3 is a flow diagram 300 illustrating an example method for performing DPD correction. In some examples, the operations represented by the blocks of the flow diagram 300 are performed by all or part of the circuits shown in FIGS. 1 and 2.

Block 302 includes monitoring an input signal. For example, an input signal (e.g., $D_{in}$) is monitored by a Tx signal profiler (e.g., 114). Monitoring the input signal may include monitoring a power of the input signal, or monitoring a Tx state associated with the input signal, as previously described.

Block 304 includes scheduling one or more capture instants based on the monitoring of the input signal. For example, the one or more capture instants are scheduled by a capture instants finder and scheduler (e.g., 116) based on data received from the Tx signal profiler, which monitors the input signal.

Block 306 includes capturing samples of one or more signals during the scheduled capture instants. For example, the one or more signals includes the input signal (e.g., $D_{in}$), an output signal (e.g., $D_{comp}$), a feedback signal (e.g., $D_{fb}$), and a signal statistics signal (e.g., $D_{stats}$), as described with reference to FIGS. 1-2.

Block 308 includes applying DPD correction to the input signal to produce the output signal based on the captured samples. For example, DPD circuitry (e.g., 104) is used to apply the DPD correction to $D_{in}$ to produce $D_{comp}$. The DPD circuitry may generate a set of DPD coefficients based on the captured samples, which may then be used by the DPD circuitry to apply the DPD correction, as previously described.

Figure 4:
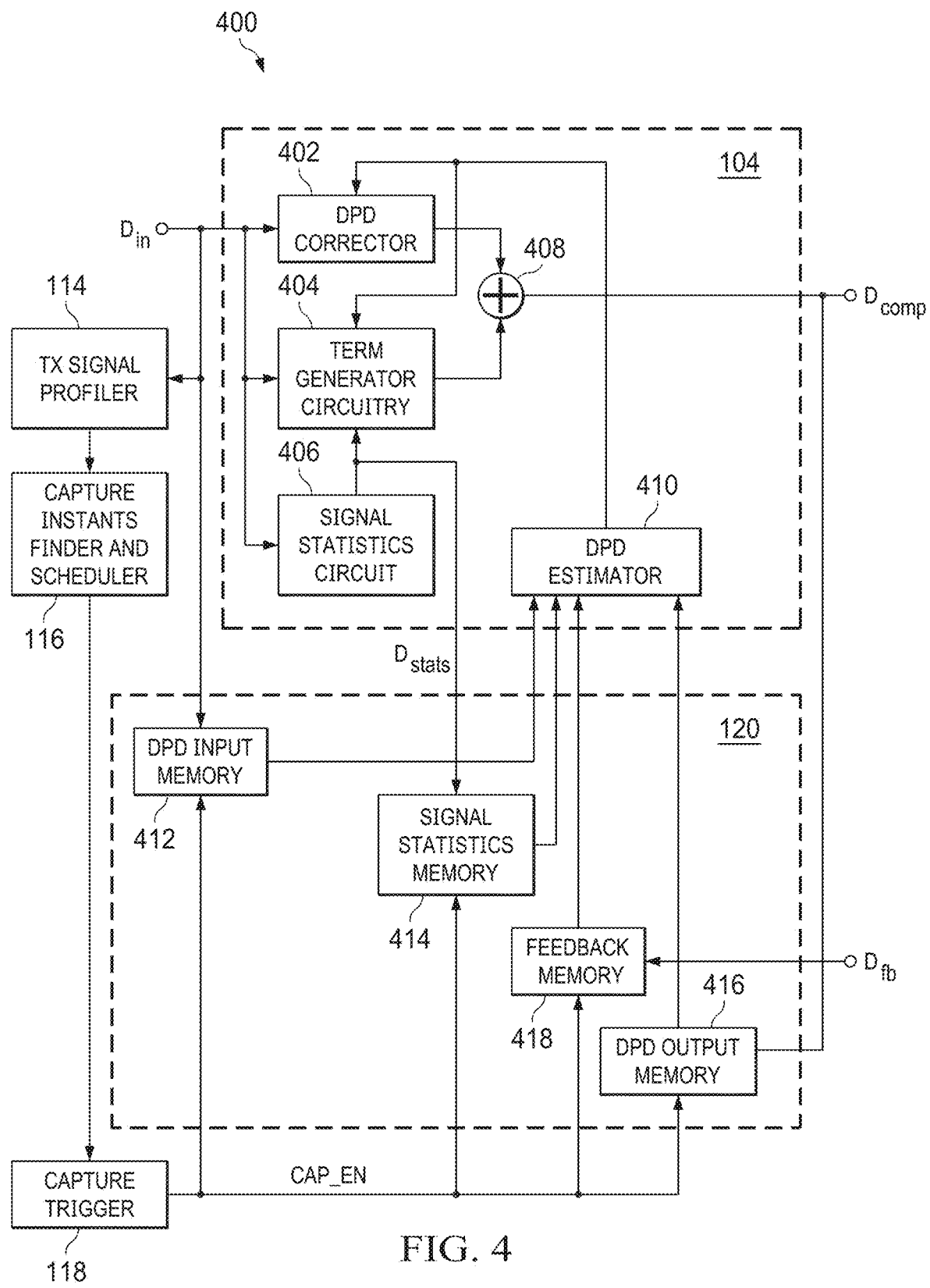
FIG. 4 is a block diagram illustrating an example circuit including details of the DPD circuitry and the capture subsystem of FIGS. 1-2.

FIG. 4 is a block diagram illustrating an example circuit 400 including further details of the DPD circuitry 104 and the capture subsystem 120 of FIGS. 1-2. As shown, the DPD circuitry 104 includes a DPD corrector 402, term generator circuitry 404, a signal statistics circuit 406, a signal combiner 408, and a DPD estimator 410. The capture subsystem 120 includes a DPD input memory 412, a signal statistics memory 414, a DPD output memory 416, and a feedback memory 418.

The DPD corrector 402 has a first input, a second input, and an output. The term generator circuitry 404 has a first input, a second input, a third input, and an output. The signal statistics circuit 406 has an input, and an output. The signal combiner 408 has a first input, a second input and an output. The DPD estimator has first, second, third, and fourth inputs, and an output. Each of the DPD input memory 412, the signal statistics memory 414 the DPD output memory 416, and the feedback memory 418 has a first input, a second input, and an output.

The first input of the DPD circuitry 104 is coupled to input of the DPD corrector 402, the first input of the term generator circuitry 404, and the input of the signal statistics circuit 406. The output of the signal statistics circuit 406 is coupled to the third input of the term generator circuitry 404. The first, second, third, and fourth inputs of the DPD estimator 410 are coupled to the second input of the DPD circuitry 104. The output of the DPD estimator 410 is coupled to the second input of the DPD corrector 402 and the second input of the term generator circuitry 404. The first and second inputs of the signal combiner 408 are coupled to the output of the DPD corrector 402 and the output of the term generator circuitry 404, respectively. The output of the signal combiner 408 is coupled to the first output of the DPD circuitry 104.

Similar to FIGS. 1-2, the first input of the Tx signal profiler 114 is coupled to the first input of the DPD circuitry 104. The input of the capture instants finder and scheduler 116 is coupled to the output of the Tx signal profiler 114, and the output of the capture instants finder and scheduler 116 is coupled to the first input of the capture trigger 118. Although not shown for simplicity, in some examples the circuit 400 further includes the peak finder 202 (e.g., as described with reference to FIG. 2).

The output of the capture trigger 118 is coupled to the second input of the DPD input memory 412, the second input of the signal statistics memory, the second input of the DPD output memory 416, and the second input of the feedback memory 418, which receive the signal CAP_EN from the capture trigger 118. As shown, the first input of the DPD input memory 412, the first input of the signal statistics memory 414, the first input of the DPD output memory 416 are coupled to the first input of the DPD circuitry 104, the second output of the DPD circuitry 104, respectively. Accordingly, the first input of the signal statistics memory 414 is coupled to the output of the signal statistics circuit 406. Although not shown in FIG. 4 for simplicity, the first input of the feedback memory 418 may be coupled to the output of the ADC 112 (e.g., as shown in FIGS. 1-2).

In some examples, the DPD input memory 412, the signal statistics memory 414, the DPD output memory 416, and the feedback memory 418 capture samples of the signals $D_{in}$, $D_{stats}$, $D_{comp}$, $D_{fb}$ respectively. The samples of the various signals may be captured responsive to the signal CAP_EN. For example, when the capture trigger 118 provides CAP_EN with a value of 'true' or 'high', samples of the signals are captured and stored in the respective corresponding memories.

As shown, the memories 412, 414, 416, 418 are coupled to the DPD estimator 410. In some examples, the DPD estimator 410 is configured to read the stored samples from the memories 412, 414, 416, 418, and generate a set of DPD coefficients based on the stored samples. In some examples, the DPD estimator 410 is further configured to generate the set of DPD coefficients based on one or more system parameters. For example, the one or more parameters includes a temperature of the system, and the DPD estimator 104 generates the set of DPD coefficients further based on the temperature of the system. The set of DPD coefficients are provided to the second inputs of the DPD corrector 402 and the term generator circuitry 404.

The DPD corrector 402 and the term generator circuitry 404 are configured to apply DPD correction to the input signal $D_{in}$ based on the set of DPD coefficients. In some examples, the DPD corrector 402 applies DPD correction by using a Generalized Memory Polynomial (GMP) model and one or more lookup tables (LUTs). The LUTs are a function of the input signal $D_{in}$ and may be pre-calibrated/pre-programmed with different values depending on a type (e.g., model) of the PA 108. For example, the GMP is modeled by the function $y(n)=x(n)+\Sigma_{k=1}^{N_{LUT}}x(n-l_1(k))*LUT(|x(n-l_2(k)|)$, where y(n) is the GMP function, x(n) is the nth sample of $D_{in}$, $l_1(k)$ and $l_2(k)$ are functions representing first and second lags (e.g., delayed samples) of x(n), and $N_{LUT}$ is the total number of LUTs. In contrast, the term generator circuitry 404 applies DPD correction to the input signal $D_{in}$ using statistics derived as a function of the signal $D_{in}$ over time. The statistics, represented by the signal $D_{stats}$, are generated by the signal statistics circuit 406 by monitoring the signal $D_{in}$. Furthermore, the signal $D_{stats}$ is provided to the signal statistics memory 414, and thus is used as feedback by the DPD estimator 410. In some alternative examples, the signal $D_{stats}$ is not provided by the DPD circuitry 104 to the capture subsystem 120, but rather is generated locally (e.g., similar to the signal statistics circuit 406) by the capture subsystem 120 using the signal $D_{in}$.

In some examples, the DPD corrector 402 corrects for non-linearity effects present in silicon based PAs, while the term generator circuitry 404 corrects for non-linearity due to electron trapping/de-trapping effects present in GaN PAs. The DPD corrected signals are provided at the outputs of the DPD corrector 402 and the term generator circuitry 404, and are combined by the signal combiner 408 to produce the signal $D_{comp}$. Further details of the term generator circuitry 404 and the signal statistics circuit 406 are described below with reference to FIGS. 10-11.

Figure 5:
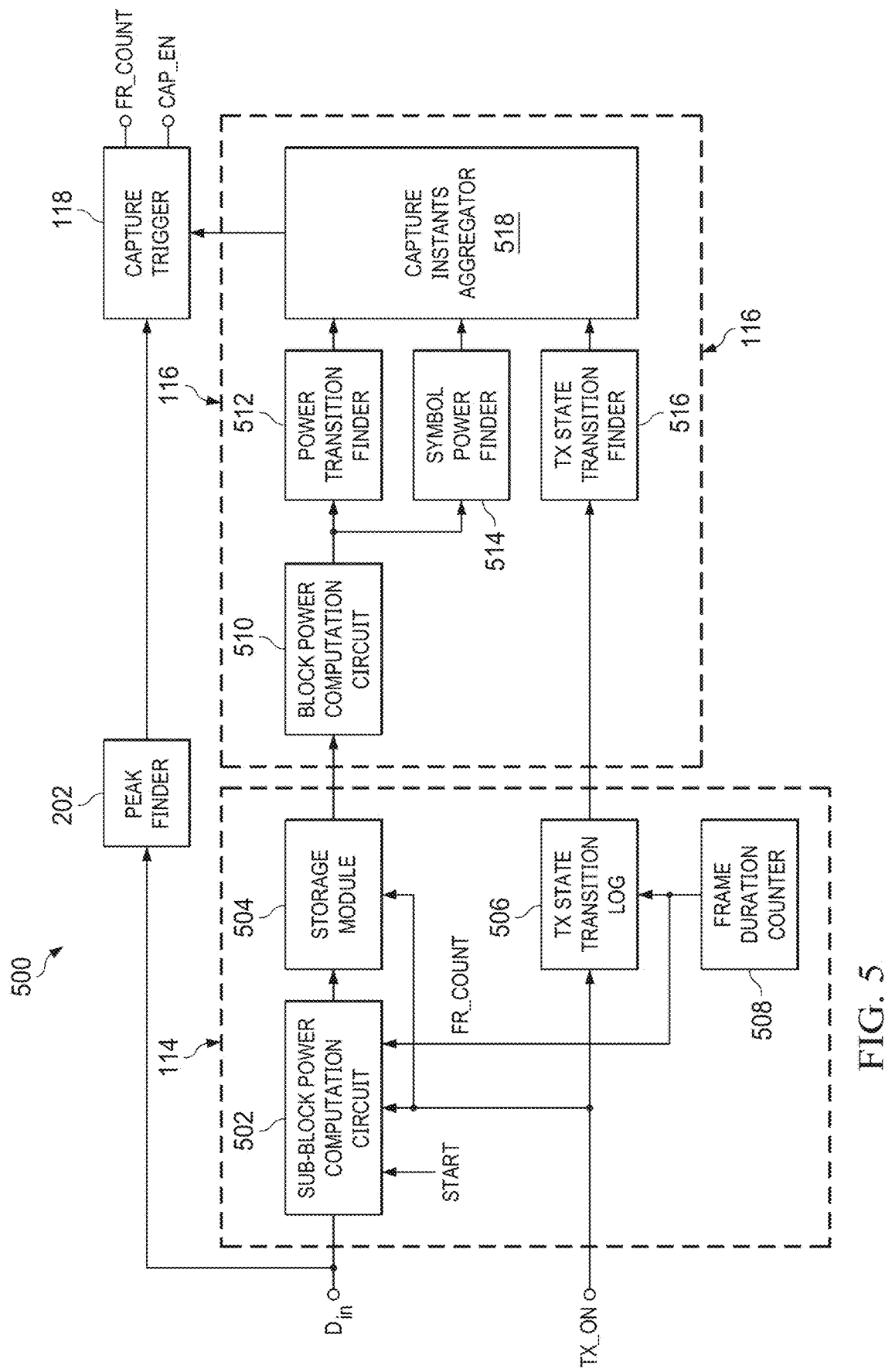
FIG. 5 is a block diagram illustrating an example circuit including details of the Tx signal profiler and the captures instants finder and scheduler of FIGS. 1-2.

FIG. 5 is a block diagram illustrating an example circuit 500 including further details of the Tx signal profiler 114 and the capture instants finder and scheduler 116 of FIGS. 1-2 and 4. As shown, the Tx signal profiler 114 includes a sub-block power computation circuit 502, a storage module 504, a Tx state transition log 506, and a frame duration counter 508. As described with reference to FIG. 1, in some examples, the components of the Tx signal profiler 114 are implemented in hardware (e.g., digital logic circuitry). The capture instants finder and scheduler 116 includes a block power computation circuit 510, a power transition finder 512, a symbol power finder 514, a Tx state transition finder 516, and a capture instants aggregator 518. In some examples, the block power computation circuit 510 is implemented in hardware, firmware, software, or a combination. In some examples, the power transition finder 512, the symbol power finder 514, the Tx state transition finder 516, and the capture instants aggregator 518 are implemented in firmware/software, however, they alternatively may be implemented in hardware or a combination of hardware/software.

The sub-block power computation circuit 502 has a first input, a second input, a third input, a fourth input, and an output. The storage module has a first input, a second input, and an output. The Tx state transition log has a first input, a second input, and an output. The frame duration counter has an output, upon which a signal FR_COUNT is provided. Each of the block power computation circuit 510, the power transition finder 512, the symbol power finder 514, and the Tx state transition finder 516 has an input and an output. The capture instants aggregator has a first input, a second input, a third input, and an output.

The sub-block power computation circuit 502 receives signals $D_{in}$, START, TX_ON, and FR_COUNT on its first, second, third, and fourth inputs respectively. As shown, the first and third inputs of the sub-block power computation circuit 502 are coupled to the first and second inputs of the Tx signal profiler 114 respectively. Furthermore, the fourth input of the sub-block power computation circuit 502 is coupled to the output of the frame duration counter 508. The first input of the storage module 504 is coupled to the output of the sub-block power computation circuit 502, and the second input of the storage module 504 is coupled to the second input of the Tx signal profiler 114. The first input of the Tx state transition log 506 is coupled to the second input of the Tx signal profiler 114, and the second input of the Tx state transition log 506 is coupled to the output of the frame duration counter 508.

The input of the block power computation circuit 510 is coupled to the output of the storage module 504, and the output of the block power computation circuit 510 is coupled to the input of the power transition finder 512 and the input of the symbol power finder 514. Although a single output is illustrated at the block power computation circuit 510, in some examples the block power computation circuit 510 includes two separate inputs coupled to the power transition finder 512 and the symbol power finder 514, respectively. The input of the Tx state transition finder 516 is coupled to the output of the Tx state transition log 506. The first, second, and third inputs of the capture instants aggregator are coupled to the outputs of the power transition finder 512, the symbol power finder 514, and the Tx state transition finder 516 respectively. The output of the capture instants aggregator 518 is coupled to the first input of the capture trigger 118.

The frame duration counter 508 is configured to provide the frame duration counter signal FR_COUNT at its output. In some examples, the frame duration counter 508 is configured to increase the value of FR_COUNT over time, and reset the value FR_COUNT according to a configured periodicity. For example, the configured periodicity is set equal to a frame duration (e.g., of a 3G/4G/5G/6G frame). In some examples, a resource allocation between frames is semi-periodic. Accordingly, the allocation of time/frequency resources largely remains the same between frames. By setting the periodicity of the frame duration counter 508 equal to the periodicity of the frame, a same value of FR_COUNT can point to a same time location within different frames. Furthermore, due to the semi-periodic resource allocation between the frames, the same time location between frames can be estimated to experience approximately the same distortion (e.g., at the PA). Thus, capture instants can be scheduled across multiple frames to collect DPD data. Furthermore, DPD correction data collected from previous frames can be used to apply DPD correction future frames.

The sub-block power computation circuit 502 is configured to compute a power of the input signal $D_{in}$ over sub-block duration(s). For example, the sub-block power computation circuit 502 computes a root mean square (RMS) power over the sub-block duration. The number of samples used for computing the RMS power during the sub-block may be configurable. Furthermore, the sub-block duration may be a configurable duration, such as 2 microseconds (µs). Also, the sub-block power computation circuit receives the signal FR_COUNT, which may be used as a time reference. For example, the sub-blocks are numbered in ascending order over time, and the numbering of the sub-blocks starts with the roll-over (e.g., upon reset of) of FR_COUNT. The sub-block number and/or the total number of sub-blocks computed per frame may also be recorded. For example, if the frame duration is 10 milliseconds (ms) and the sub-block duration is 2 µs, the number of sub-blocks per frame is 5000. In some examples, the sub-block power computation circuit 502 also receives the signal TX_ON. If TX_OFF (e.g., TX_ON high to low transition) occurs during a sub-block, then the power of the sub-block may be recorded with a special value to indicate an "invalid" sub-block.

In some examples, the START signal is provided to the sub-block power computation 502 to trigger data capture. For example, the START signal is provided during once every multiple frames. Since the frames are semi-periodic, the DPD data may be reused for multiple frames without a significant degradation in performance. For example, the DPD data is be used to compute parameters such as power profile of the signal $D_{in}$. The parameters may be semi-periodic, and thus, can be reused for the multiple frames until the next data capture. Also, the START signal may be synchronized with the frame duration counter (e.g., FR_COUNT). For example, the START signal is synchronized with the roll-over of the frame duration counter. Accordingly, the data capture/sub-block power computation is also synchronized with the frame duration counter, and therefore, the frame structure. In some alternative examples, the data is continuously collected, in which case the sub-block power computation circuit 502 does not need to receive the START signal. Although not shown for simplicity, the START signal may be provided to various other components within the Tx signal profiler 114 and/or the capture instants finder and scheduler 116 either directly, or indirectly via the sub-block power computation circuit 502.

The storage module 504 is configured to store the sub-block power values computed by the sub-block power computation circuit 502. The storage module 504 receives the signal TX_ON, which may be used to generate clock(s) for the storage module 504. In one example, a memory write clock is gated during TX_OFF (e.g., TX_ON='low') to save power. When TX_ON occurs, the write clock can be ungated to write the sub-block power values. Furthermore, the storage module 504 may receive the signals START and FR_COUNT, either directly, or indirectly via the sub-block power computation circuit 502. In some examples, a storage location of each sub-block power is computed based on FR_COUNT.

In some examples, before reception of the START signal, all memory locations within the storage module 504 are initially written with the special value to indicate "invalid" sub-block powers. Then, after reception of the START signal and during TX_ON (e.g., when the write clock is ungated), the sub-block powers are computed (e.g., by 502) and stored in the appropriate memory locations of the storage module 504 (e.g., based on FR_COUNT). As a result, the computed sub-block powers overwrite the "invalid" values during TX_ON, and the initial "invalid" values remain stored (e.g., not overwritten) during TX_OFF (e.g., due to the memory write clock being gated). Accordingly, the TX_ON sub-block powers can be used, and the TX_OFF sub-block powers can be filtered out, while also minimizing power consumption by gating the memory write clock during TX_OFF. Such techniques can be applied, for example, during TDD operation.

The Tx state transition log 506 is configured to log TX_ON to TX_OFF and/or TX_OFF to TX_ON transitions. For example, TX_OFF corresponds to the signal TX_ON with a value of 'low' and TX_ON corresponds to the signal TX_ON with a value of 'high'. The Tx state transition log 506 receives the signal FR_COUNT, which may be used to record a timestamp (e.g., value of FR_COUNT) with each TX state transition.

The block power computation circuit 510 is configured to compute a power of the input signal $D_{in}$ over block duration (s) based on the computed sub-block powers stored in the storage module 504. In some examples, the block duration is greater than the sub-block duration. Furthermore, the block duration may be equal or approximately equal to an orthogonal frequency division multiplexing (OFDM) symbol duration in the time domain for a configured sub-carrier spacing (SCS). For example, if each sub-block is 2 μs, then 33 sub-blocks are aggregated to determine power over a block of 66 μs, which approximately corresponds to an OFDM symbol duration for 15 kilohertz (kHz) SCS. In 15 kHz SCS, a frame may have a duration of 10 ms and consist of 10 slots each having a duration of 1 ms, where each slot consists of 14 OFDM symbols. Although the example of 15 kHz SCS is given, other SCS values (e.g., 30 kHz, 60 kHz, 120 kHz, 240 kHz) may alternatively be configured, and the frame and/or OFDM symbol duration may vary based on the configured SCS. Accordingly, the configured block duration (and therefore, the number of sub-blocks per block) may also vary depending on the configured SCS. The configured SCS may refer to the SCS used to transmit the signal $V_{Tx\_A}$ (e.g., using the circuitry of FIGS. 1-2, etc.). In some alternative examples, the block duration is equal to half of the OFDM symbol duration.

The power transition finder 512 is configured to determine low-to-high and/or high-to-low power transitions in the input signal $D_{in}$, and schedule capture instants based on the determined power transitions. In some examples, the power transition finder 512 detects the power transitions based on the computed block and/or sub-block powers and one or more power threshold values. For example, if a power variation between blocks or sub-blocks exceeds a power threshold value, then the power transition finder 512 detects a power transition. Then, the power transition finder 512 schedules a configurable number of capture instants at each power transition. In some examples, the number of capture instants is configured based on characteristics of the PA (e.g., 108). For example, different numbers of capture instants could be determined for different types of PAs based on experimentation. Further details of the operation of the power transition finder 512 are described below with reference to FIG. 7.

The symbol power finder 514 is configured to categorize the block powers into a plurality of power sub-ranges, and schedule capture instants based on the categorized block powers. The values of the plurality of power sub-ranges may be configurable. In one example, the power sub-ranges include [−4, −10], (−10, −16], (−16, −24], and (−24, −32] in units of decibels relative to full scale (dBFS). For example, the power range (−10, −16] represents the sub-range −16 dBFS<=symbol power<−10 dBFS. All of the blocks in a frame may be categorized into one of the sub-ranges and stored along with a corresponding frame duration counter timestamp (e.g., value of FR_COUNT). Furthermore, the block powers within the sub-ranges may be sorted in descending order of power. Then, a configurable number of capture instants may be scheduled in each power sub-range. Since a signal with a higher power will generally experience higher distortion at the PA, sorting the block powers in descending order of power allows for the instants experiencing the highest distortion to be prioritized for capture scheduling. Further details of the operation of the symbol power finder 514 are described below with reference to FIG. 8.

The Tx state transition finder 516 is configured to schedule capture instants based on the Tx state transitions recorded in the Tx state transition log 506. For example, the Tx state transition finder 516 schedules a configurable number of capture instants at a configurable offset from the Tx OFF to ON transition. Additionally or alternatively, the Tx state transition finder 516 schedules a configurable number of capture instants at a configurable offset from the Tx ON to OFF transition. The configurable number of capture instants and the configurable offset may be the same or different for the Tx OFF to ON transition and the Tx ON to OFF transition. In some examples, the number of captures is derived based on an arithmetic function, such as an arithmetic progression, a geometric progression, a combination of arithmetic/geometric progressions, or any other arithmetic function. For example, a first time instant is equal to t1, and a second time instant is equal to $(t1+(n-1)*t_{gap_{TX}})*s^{n-1}$, where $t_{gap\_TX}$ is a time gap between captures and s is a scale factor for geometric progression.

The capture instants aggregator 518 is configured to aggregate and/or prune the capture instants provided by the power transition finder 512, the symbol power finder 514, and the Tx state transition finder 516. In some examples, the capture instants aggregator 518 is configured to prune any duplicate and/or overlapping capture instants. For example, if a first capture time instant lies in a time interval for a second capture time instant, then the first capture time instant could be dropped. In some examples, the capture instants aggregator 518 further prunes any capture instants during TX_OFF (e.g., TX_ON='low') state. For example, the capture instants aggregator 518 checks whether a capture instant contains a sub-block with an "invalid" value, as described above.

In some examples, the capture instants aggregator 518 further prunes capture instants in close proximity (e.g., in time) to other capture instants, for example, by pruning capture instants beginning within a time offset from the end of another capture instant. For example, if a current capture starts at time $t_{start1}$ and ends at $t_{end1}$, then the start of the next capture may be $t_{end1}+t_{gap}$, where $t_{gap}$ is equal to the time offset. Any capture instants between $t_{start1}$ and $t_{end1}+t_{gap}$ may be pruned.

In some examples, the capture instants aggregator 518 further prunes capture instants having a similar power change. For example, if there are multiple capture instants which have a low power to high power change of greater than 5 decibels (dBs), then only some capture instants within a range (e.g., 5 dB+−1 dB) are kept, and the remaining capture instants are pruned.

After pruning/aggregation, the capture instants may be re-used until the input signal $D_{in}$ is reprofiled. For example, the capture instants may be reused for multiple frames with minimal impact to performance, due to the semi-periodic resource allocation between the frames. When user profiling is changed (e.g., when user resource allocation is changed), re-profiling may be performed to generate new capture instants.

The capture instants aggregator 518 provides the aggregated/pruned capture instants to the capture trigger 118, which provides the signal CAP_EN during the scheduled capture instants. For example, the capture trigger 118 determines when a capture instant is scheduled by comparing the frame duration counter value (e.g., FR_COUNT) to a frame duration counter value scheduled for the capture instant.

In some examples, the capture trigger 118 polls the frame duration counter, and adds slack time to the polled frame duration counter value to compute a predicted frame duration counter value. The slack time represents a processing delay of the capture trigger 118, such that the predicted frame duration counter value is approximately equal to a frame duration counter value at which the capture trigger 118 will be ready to schedule a capture. Then, the capture trigger 118 selects a capture instant which is a minimum of all the capture instants which are greater than or equal to the predicted counter value and whose captures have not yet been done during a DPD iteration. For example, the capture trigger 118 selects the earliest capture instant occurring after the predicated frame duration counter value that has not been captured in a previous DPD iteration. The scheduled capture instants are not required to be performed within a single frame. For example, the capture instants can be performed across multiple frames (e.g., utilizing the semi-periodic resource allocation between frames). In some examples, the capture trigger 118 is implemented as a micro-controller or microprocessor configured to execute instructions stored in a memory.

In some alternative examples, the Tx state transition log 506 is coupled to the power transition finder 512. In such examples, the power transition finder 512 could derive for which blocks Tx OFF occurs based on the Tx state transition log 506 and corresponding FR_COUNT values, without using the "invalid" code as described above. Accordingly, in such examples, the TX_ON does not need to be provided to the sub-block power computation circuit 502 and the storage module 504.

Figure 6:
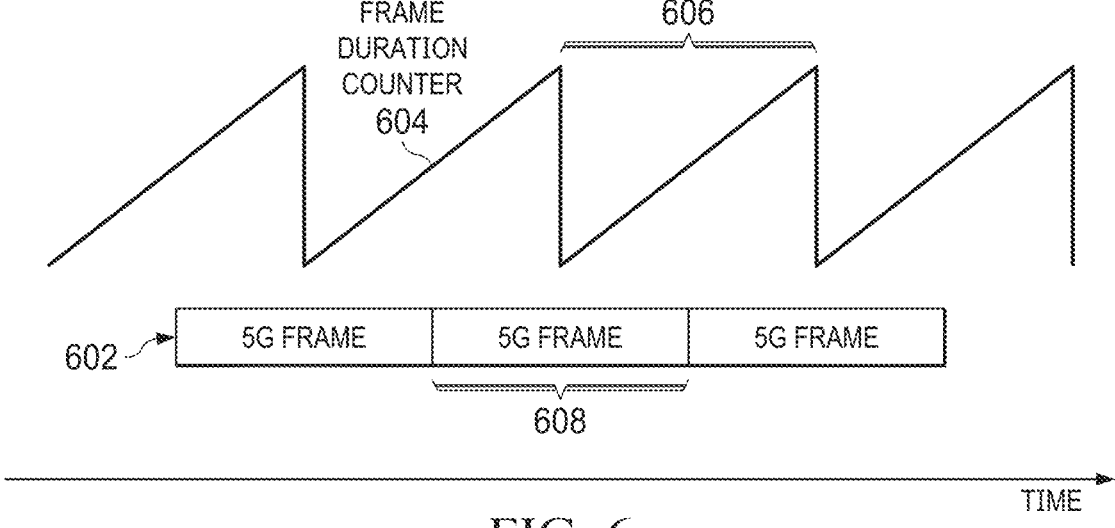
FIG. 6 is a waveform diagram illustrating an example frame duration counter as described with reference to FIG. 5.

FIG. 6 is a waveform diagram illustrating an example of the frame duration counter as described with reference to FIG. 5. Illustrated is the frame duration counter 604 (e.g., value of FR_COUNT) and a 5G frame over time. As shown, a period 606 of the frame duration counter 604 is equal to a period 608 of the 5G frame 602. As previously described, due to the semi-periodic allocation of resources within the 5G frame 602, the start of the frame duration counter 604 need not be synchronized with the start of the 5G frame 602, as long as the period 606 is set equal to the period 608. Although a 5G frame is illustrated in the present example, similar techniques can be applied using previous generation (e.g., 3G, 4G) frame structure and/or future generation (e.g., 6G, 7G) frame structure.

Figure 7:
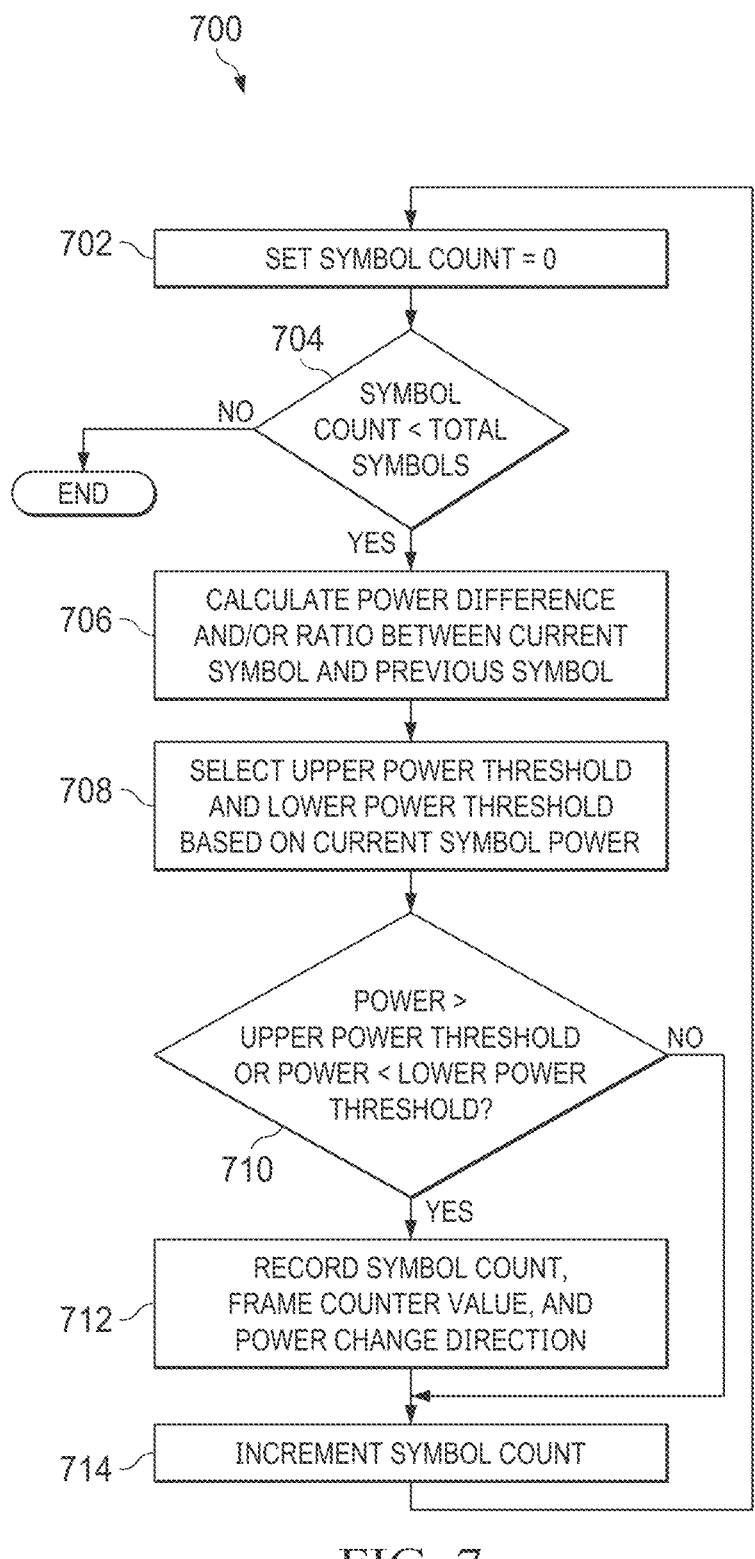
FIG. 7 is a flow diagram illustrating an example method for finding power transitions.

FIG. 7 is a flow diagram illustrating an example method 700 for finding power transitions. In some examples, the method 700 is performed by the power transition finder 512, as described with reference to FIG. 5.

Block 702 includes setting a symbol count value equal to 0.

Block 704 includes checking whether the symbol count value is less than a total number of symbols. The total number of symbols, for example, is equal to a total number of symbols in a 5G frame. If the symbol count is not less than the total number of symbols, then the method 700 ends. Otherwise, the method proceeds to block 706.

Block 706 includes calculating a power difference and/or a power ratio between the current symbol and the previous symbol. In some examples, the block duration is configured to be equal to the symbol duration, as described with reference to FIG. 5. In such examples, the power difference and/or power ratio between symbols can be determined by evaluating the power difference and/or power ratio between blocks.

Block 708 includes selecting an upper power threshold and a lower power threshold based on the current symbol power. The current symbol power, for example, is equal to the calculated block power for the current value of FR_COUNT. In one example, the upper and lower power thresholds are set based on a 5 dB swing relative to the current symbol power. For example, a 5 dB increase relative to the current symbol power would yield the upper power threshold, and a 5 dB decrease relative to the current symbol power would yield the lower power threshold.

Block 710 includes checking whether the calculated power difference and/or the calculated power ratio is greater than an upper power threshold, or less than a lower power threshold. If neither condition is satisfied (e.g., the calculated power difference or ratio is between the upper and lower power thresholds), then the method 700 proceeds to block 714 (skipping block 712). Otherwise, if either of the conditions is satisfied (e.g., the calculated power difference or ratio is greater than the upper power threshold or less than the lower power threshold), then the method 700 proceeds to block 712.

Block 712 includes recording the symbol count value, the frame duration counter value, and a power change direction. The symbol count value is the symbol count value referenced in blocks 702, 704. The frame duration counter value, for example, is given by FR_COUNT. The power change direction may be determined based on which condition from block 710 was satisfied. For example, when the calculated power exceeds the upper power threshold the power change direction is upwards, and when the calculated power is less than the lower power threshold the power change direction is downwards.

Block 714 includes incrementing the symbol count value. After block 714, the method 800 repeats with block 702.

Figure 8:
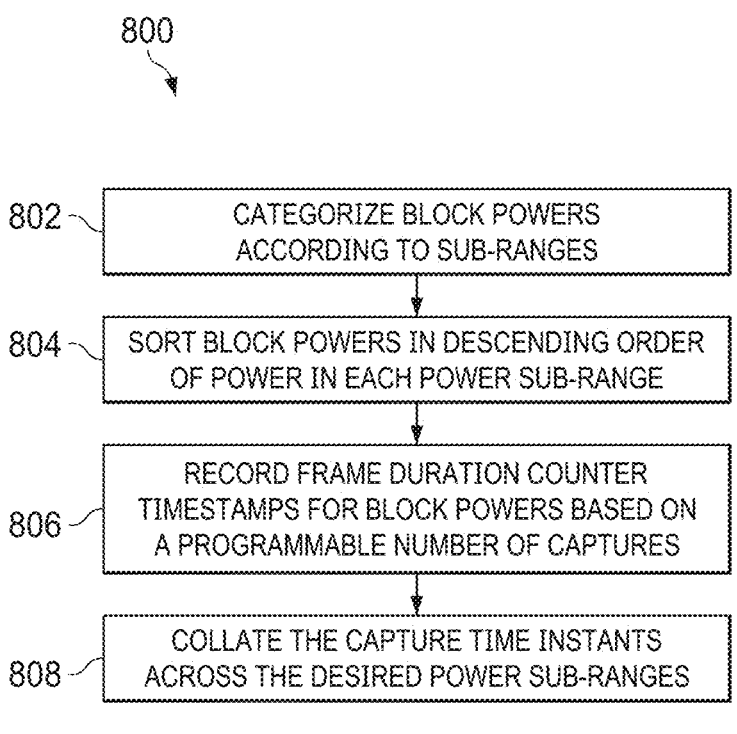
FIG. 8 is a flow diagram illustrating an example method for finding symbol power.

FIG. 8 is a flow diagram illustrating an example method 800 for finding symbol power. In some examples, the method 800 is performed by the symbol power finder 514, as described with reference to FIG. 5.

Block 802 includes categorizing block powers into a plurality of power sub-ranges. For example, the block powers are received from a block power computation circuit (e.g., 510), as described with reference to FIG. 5.

Block 804 includes sorting the block powers in descending order of power within each power sub-range, for example, as described with reference to FIG. 5.

Block 806 includes recording the frame duration counter value based on a programmable number of captures within each power sub-range. The programmable number of captures may be used to limit a number of captures within a particular sub-range. Since the block powers are sorted in descending order of power (e.g., block 804), the higher power blocks may be prioritized for capture scheduling. The frame duration counter value, for example, is given by FR_COUNT, and is used as a timestamp to reference each block power.

Block 808 includes collating the capture time instants across the desired power sub-ranges. For example, the programmable number of captures (e.g., from block 806) across all subranges are collated to form an overall set of capture instants.

Figure 9:
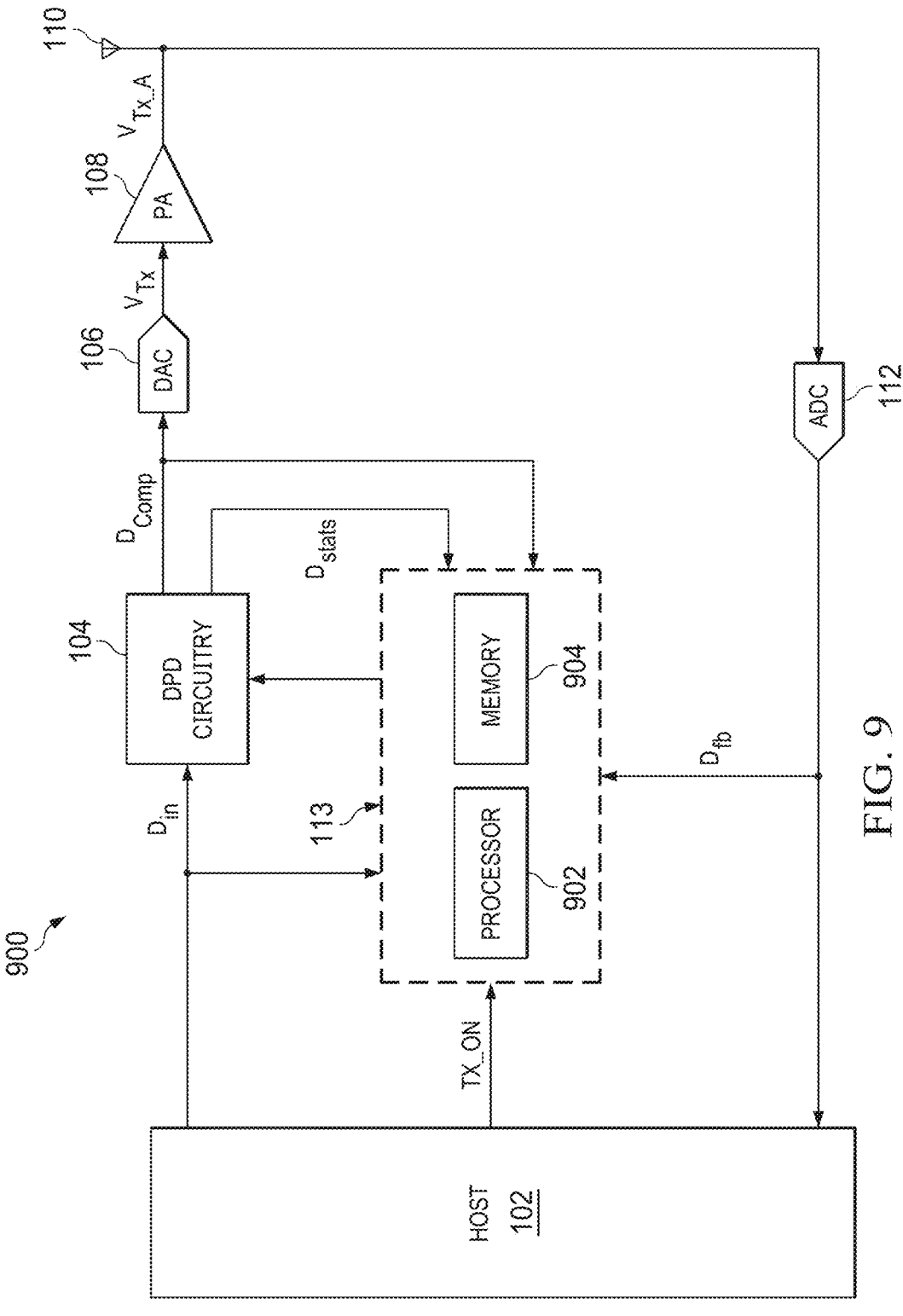
FIG. 9 is a block diagram illustrating a Tx signal chain including a processor and memory for performing DPD correction.

FIG. 9 illustrates an example circuit 900 of a Tx signal chain. The circuit 900 resembles the circuit 100 of FIG. 1, but differs in that the signal capture circuit 113 includes differing elements. In the example of FIG. 9, the signal capture circuit 113 includes a processor 902 and memory 904. For example, the processor 902 is coupled to the memory 904, and is configured to execute instructions stored in the memory, to achieve the functionality of the signal capture circuit 113 described herein. For example, the above-described functionality of the Tx signal profiler 114, the capture instants finder and scheduler 116, the capture trigger 118, the capture subsystem 120, the peak finder 202, and any sub-blocks thereof may be implemented by the processor 902 by executing instructions stored in the memory 904.

Figure 10:
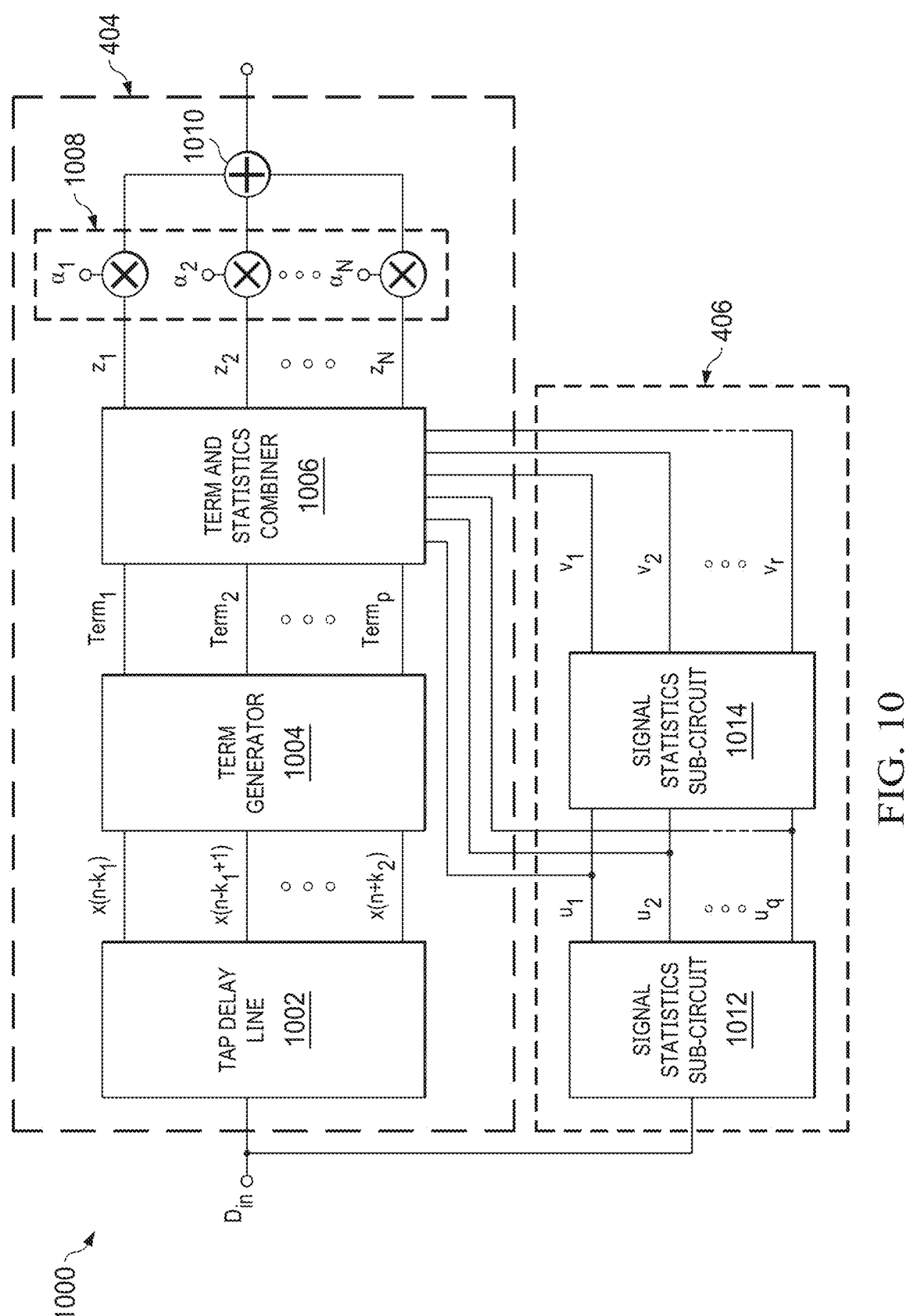
FIG. 10 is a block diagram illustrating details of the term generator circuitry and the signal statistics circuit of FIG. 4

FIG. 10 illustrates an example circuit 1000 including further details of the term generator circuitry 404 and the signal statistics circuit 406 of FIG. 4. As shown, the term generator circuitry 404 includes a tap delay line 1002, a term generator 1004, a term and statistics combiner 1006, a plurality of multipliers 1008, and a signal combiner 1010. The signal statistics circuit 406 includes a (first) signal statistics sub-circuit 1012 and a (second) signal statistics sub-circuit 1014.

The tap delay line 1002 has an input coupled to the input of the term generator circuitry 404, and a plurality of outputs. The term generator 1004 has a plurality of inputs coupled to the plurality of outputs of the tap delay line 1002 respectively, and a plurality of outputs. The term and statistics combiner 1006 has a first plurality of inputs coupled to the plurality of outputs of the term generator 1004 respectively, a second plurality of inputs, and a plurality of outputs. Each signal multiplier of the plurality of signal multipliers 1008 has a first input, a second input, and an output. The first inputs of the plurality of signal multipliers 1008 are coupled to the plurality of outputs of the term and statistics combiner 1006 respectively. The signal combiner 1010 has a plurality of inputs, and an output. The plurality of inputs of the signal combiner 1010 are coupled to the outputs of the plurality of signal multipliers 1008 respectively, and the output of the signal combiner 1010 is coupled to the output of the term generator circuitry 404.

The signal statistics sub-circuit 1012 has an input coupled to the input of the signal statistics circuit 406, and a plurality of outputs coupled to some of the second plurality of inputs of the terms and statistics combiner 1006, which represents the coupling between the output of the signal statistics circuit 406 and the second input of the term generator circuitry 404. The signal statistics sub-circuit 1014 has a plurality of inputs coupled to the plurality of outputs of the signal statistics sub-circuit 1012, and a plurality of outputs coupled to rest of the second plurality of inputs of the terms and statistics combiner, which represents the coupling between the output of the signal statistics circuit 406 and the second input of the term generator circuitry 404.

As shown, in some examples the output of the signal statistics circuit 406 includes a plurality of outputs at which a plurality of signal statistics $u_1, u_2, \ldots, u_q, v_1, v_2, \ldots, V_r$ are provided. Similarly, the second input of the term generator circuitry 404 includes a plurality of inputs upon which the plurality of signal statistics are received. As shown, the plurality inputs of the term generator circuitry 404 are coupled to the plurality outputs of the signal statistics circuit 406 respectively. The signal statistics $u_1, u_2, \ldots, u_q$ may be referred to as a first set of signal statistics, and the signal statistics $v_1, v_2, \ldots, v_r$ may be referred to as a second set of signal statistics. In some examples, the signal $D_{stats}$ (e.g., as described with reference to FIGS. 1, 2, etc.) refers to $u_1, u_2, \ldots, u_q$ and/or $v_1, v_2, \ldots, v_r$. In the example where $D_{stats}$ includes $u_1, u_2, \ldots, u_q$ (but not $v_1, v_2, \ldots, v_r$), the statistics $v_1, v_2, \ldots, v_r$ can be derived locally within the capture subsystem 120 using the statistics $u_1, u_2, \ldots, u_q$.

The tap delay line 1002 generates and provides delayed samples and advanced samples of the signal $D_{in}$ at the plurality of outputs of the tap delay line 1002. For example, $x(n)$ represents the nth sample of $D_{in}$, and the tap delay line 1002 provides samples in the range of $x(n-k_1)$ to $x(n+k_2)$. The boundary of the delayed samples is determined by $k_1$, and the boundary of the advanced samples is determined by $k_2$. In some examples, the tap delay line 1002 delays the input signal $D_{in}$, such that $x(n+k_2)$ represents the "current" sample of $D_{in}$. Accordingly, a time difference between $x(n+k_2)$ and $x(n)$ represents a time delay due to signal processing by the circuit 1000. In the illustrated example, a step size of 1 is used between the delayed and advanced samples $x(n-k_1)$, $x(n-k_1+1)$, ..., $x(n+k_2)$. However, in alternative examples, a different integer value may be used as the step size.

The term generator 1004 generates a first plurality of terms (also referred to as a first set of terms) based on signals received on the plurality of inputs of the term generator 1004, and provides the first plurality of terms at the plurality of outputs of the term generator 1004 respectively. In the illustrated example, the term generator 1004 generates the first set of terms based on the delayed samples and/or the advanced samples of the signal $D_{in}$. In some examples, the term generator 1004 generates the first set of terms further based on an envelope (e.g., absolute value) of the signal $D_{in}$. As shown, the first set of terms may include p number of terms $Term_1, Term_2, \ldots, Term_p$, which may include linear and/or non-linear terms. In some examples, the linear terms are generated as $x(n-l)$, where $-k_2 \leq l \leq k_1$ and $k_1=k_2=1$. Further, the non-linear terms are generated by $x(n-l_1)|x(n-l_2)|^m$, where $-k_2 \leq l_1 \leq k_1$, $-k_2 \leq l_2 \leq k_1$, and $k_1=k_2=1$. Although example of $k_1=k_2=1$ is used, other alternatives such as $k_1=k_2=2$, $k_1=k_2=3$, etc. may also be used depending on a type of the PA 108. Further, a value of m may be selected based on the type of the PA 108. Each term of the p number of terms is generated as a linear term or a non-linear term which, for example, is pre-calibrated for each PA type. In some examples, the values of m ranges between 1 and 21. In some additional or alternative examples, m is selected from a set of even integers containing 2, 4, 6, 8, and 10.

The term and statistics combiner 1006 generates a second plurality of terms (also referred to as a second set of terms) based on the first set of terms and the first and second sets of signal statistics. The generation of the second set of terms may be further based on a type (e.g., model) of the PA (e.g., PA 108). For example, the term and statistics combiner 1006 generates the second set of terms based on a statistics model, and a different statistics model is used for different PAs. As shown, the second set of terms includes N number of terms $z_1, z_2, \ldots, z_N$. In some examples, the second set of terms are generated as $z_h=Term_i*u_j$ where $h=1, 2, \ldots, N$, $1 \leq i \leq p$, and $1 \leq j \leq q$. In some examples, the second set of terms are generated as $z_h=Term_i*v_k$ where $h=1, 2, \ldots, N$, $1 \leq i \leq p$, and $1 \leq k \leq r$. In some alternative examples, some terms are generated according to the first equation, while other terms are generated according to the second equation. The specific Term and statistics u, v used to generate a given term z may vary, for example, depending on a type of the PA. Note, a single term from the first set of terms (e.g., $Term_1$) may be used to generate multiple terms from the second set of terms. For example, $z_1=Term_1*u_1$ and $z_2=Term_1*v_1$. As shown, the term and statistics combiner 1006 provides the second set of terms at the plurality of outputs of the term and statistics combiner 1006.

Each signal multiplier of the plurality of signal multipliers 1008 provides a signal at the output of the signal multiplier based on a multiplication of a signal received on the first input of the signal multiplier and a signal received on the second input of the signal multiplier. As shown, the terms (e.g., signals) $z_1, z_2, \ldots, z_N$ are received on the first inputs of the plurality of signal multipliers 1008 respectively, and the terms $\alpha_1, \alpha_2, \ldots, \alpha_N$, are received on the second inputs of the plurality of signal multipliers 1008 respectively. Accordingly, the plurality of signal multipliers 1008 output signals $z_1*\alpha_1, z_2*\alpha_2, \ldots, z_N*\alpha_N$ respectively, which are received by the signal combiner 1010. The signal combiner 1010 combines the received signals, and provide a combined signal at the output of the signal combiner 1010. For example, the signal combiner 1010 adds the received signals to produce the signal at the output of the signal combiner 1010. In some examples, the terms $\alpha_1$, $\alpha_2$, . . . , $\alpha_N$ are pseudo static coefficients received from a DPD estimator (e.g., 410 of FIG. 4). In one example, the circuit 1000 is implemented by hardware such as logic circuitry, and the DPD estimator is implemented in hardware such as logic circuitry and/or software executed in a processor.

The signal statistics cub-circuit 1012 generates the first set of signal statistics based the signal $D_{in}$ received on the input of the signal statistics sub-circuit 1012. For example, the signal statistics sub-circuit 1012 generates the first set of signal statistics based on the signal $D_{in}$ and one or more delayed samples of $D_{in}$. In some further examples, the signal statistics sub-circuit 1012 generates the first set of signal statistics based on absolute values of the signal $D_{in}$ and the one or more delayed samples of $D_{in}$. Additionally or alternatively, one or more sets of independent parameters may be configured, where a different set of independent parameters is used to generate each signal statistic $u_1$, $u_2$, . . . , $u_q$ of the first set of signal statistics.

The signal statistics sub-circuit 1014 generates the second set of signal statistics based on the first set of signal statistics. For example, the signal statistics sub-circuit 1014 generates each signal statistic $v_1$, $v_2$, . . . , $v_r$ of the second set of signal statistics based on a multiplication of one or more statistics of the first set of signal statistics. In one example, the signal statistics sub-circuit 1014 generates the signal statistics as $v_1=u_1^2$, $v_2=u_1*u_2$, etc. The one or more statistics to be multiplied may be selected from the first set of signal statistics based on a type of the PA (e.g., PA 108).

Figure 11:
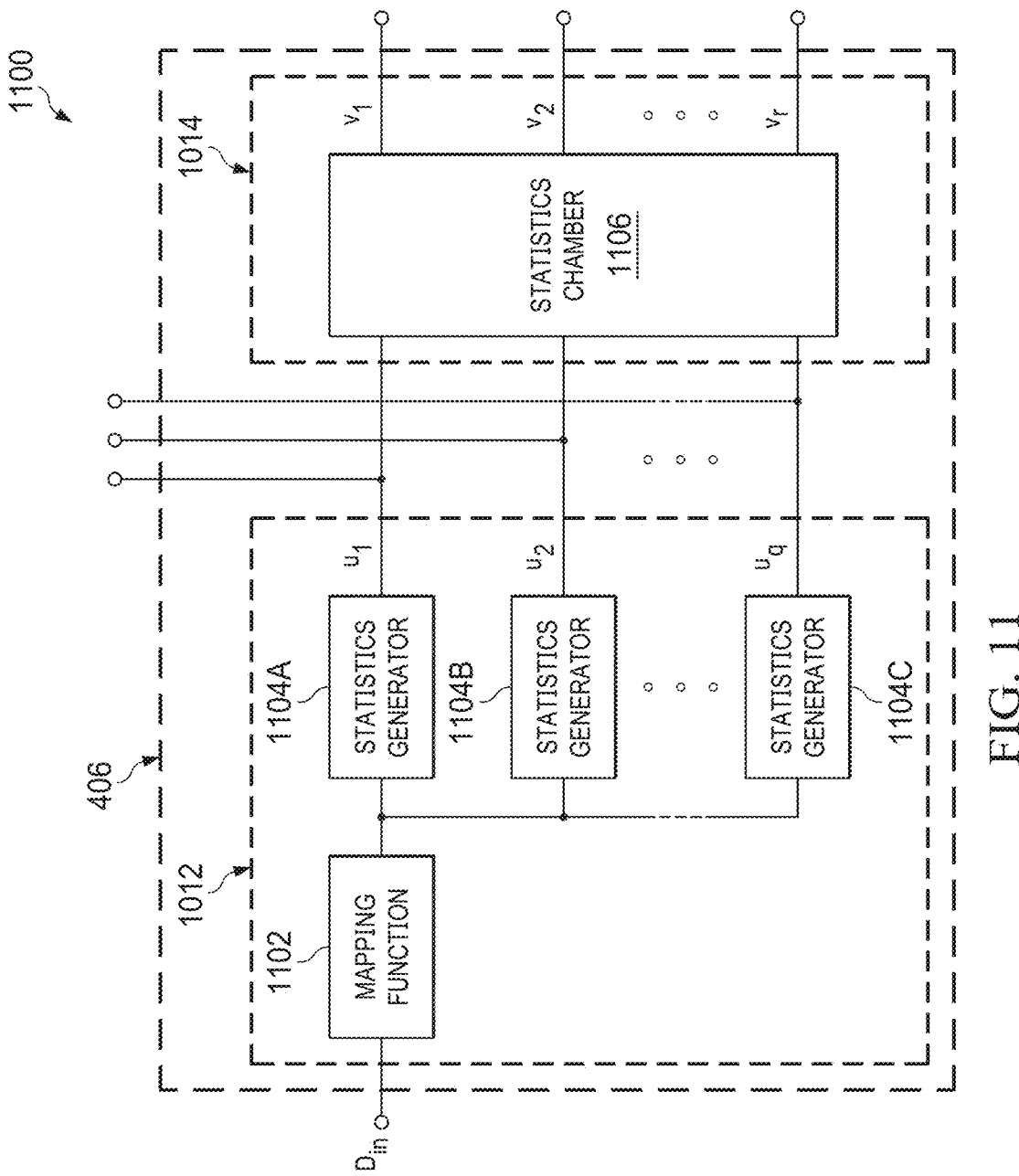
FIG. 11 is a block diagram illustrating further details of the signal statistics circuit of FIG. 4.

FIG. 11 illustrates an example circuit 1100 including the signal statistics circuit 1106 of FIGS. 4 and 11. Similar to FIGS. 4 and 11, the signal statistics circuit 406 includes the (first) signal statistics sub-circuit 1012 and the (second) signal statistics sub-circuit 1014. As shown, the signal statistics sub-circuit 1012 includes a mapping function 1102, and a plurality of statistics generators 1104A, 1104B, 1104C. The signal statistics sub-circuit 1014 includes a statistics combiner 1106.

The mapping function 1102 (also referred to as a signal mapper) has an input coupled to the input of the signal statistics sub-circuit 1012, and an output. As shown, each of the statistics generators 1104A, 1104B, 1104C has an input coupled to the output of the mapping function 1102, and an output coupled to an output of the plurality of outputs of the signal statistics sub-circuit 1012 respectively. The statistics combiner 1106 has a plurality of inputs coupled to the plurality of inputs of the signal statistics sub-circuit 1014, and a plurality of outputs coupled to the plurality of outputs of the signal statistics sub-circuit 1014.

In some examples, the mapping function 1102 provides the absolute value of the signal $D_{in}$ at the output of the mapping function 1102. The provided signal is received at the inputs of the statistics generators 1104A, 1104B, 1104C.

As shown, the signal statistics sub-circuit 1012 includes q number of statistics generators 1104A, 1104B, . . . , 1104C. Each statistics generator provides one of the signal statistics $u_1$, $u_2$, . . . , $u_q$ respectively. In some examples, the signal statistics are generated according to the equation $u_i(n)=f_i$ ({$|x(n)|$, $|x(n-1)|$, . . . , $|x(0)|$}), where i=1, 2, . . . , q, and x(n) is the nth sample of $D_{in}$ (e.g., at the time instance n). In the example of FIG. 4, the function $f_i$ corresponds to the ith statistics generator. For example, the function $f_1$ corresponds to the statistics generator 1104A, the function $f_2$ corresponds to the statistics generator 1104B, the function $f_q$ corresponds to the statistics generator 1104C, etc.

In some examples, each statistics generator generates an average of the input of the statistics generator, and provides the generated average at the output of the statistics generator. For example, the statistics generator includes a state dependent dual time constant filter. An example state dependent dual time constant filter can be modeled by the following equations:

$$(1 + 2f_{DPD}\tau_d)\text{out}(n) + (1 - 2f_{DPD}\tau_d)\text{out}(n-1) = 2|\text{in}(n)|,$$

$$\text{out}(n-1) > |\text{in}(n)|$$

$$(1 + 2f_{DPD}\tau_u)\text{out}(n) + (1 - 2f_{DPD}\tau_u)\text{out}(n-1) = 2|\text{in}(n)|,$$

$$\text{out}(n-1) \leq |\text{in}(n)|$$

Where in(n) is the input of the filter, out(n) is the output of the filter, and $f_{DPD}$ is the dynamic DPD sampling frequency. Filter parameters $\tau_d$ and $\tau_u$ denote the discharging and charging time constants respectively, which may be independent (e.g., different values) for each statistics generator. In some examples, the filter parameters $\tau_d$ and $\tau_u$ vary depending on a type of the PA (e.g., PA 108). In an alternative example, the statistics generator includes a moving average filter with length $L_k$, k=1, 2, . . . , q.

The statistics combiner 1106 generates the second set of signal statistics based on the first set of signal statistics. For example, the statistics combiner 1106 generates the second set of signal statistics $v_1$, $v_2$, . . . , $v_r$ according to the equation:

$$v_i = u_1^{n_{i1}} * u_2^{n_{i2}} * \ldots * u_q^{n_{iq}}.$$

Where $n_{i1}$, $n_{i2}$, . . . , $n_{iq}$ are non-negative integers. The values of the non-negative integers, for example, vary based on a type of the PA (e.g., PA 108). Furthermore, the number of signal statistics generated by the statistics combiner 1106 may be dependent on the type of the PA. In some examples, the values of p, q, r, N are determined based on the type of the PA.

Figure 12:
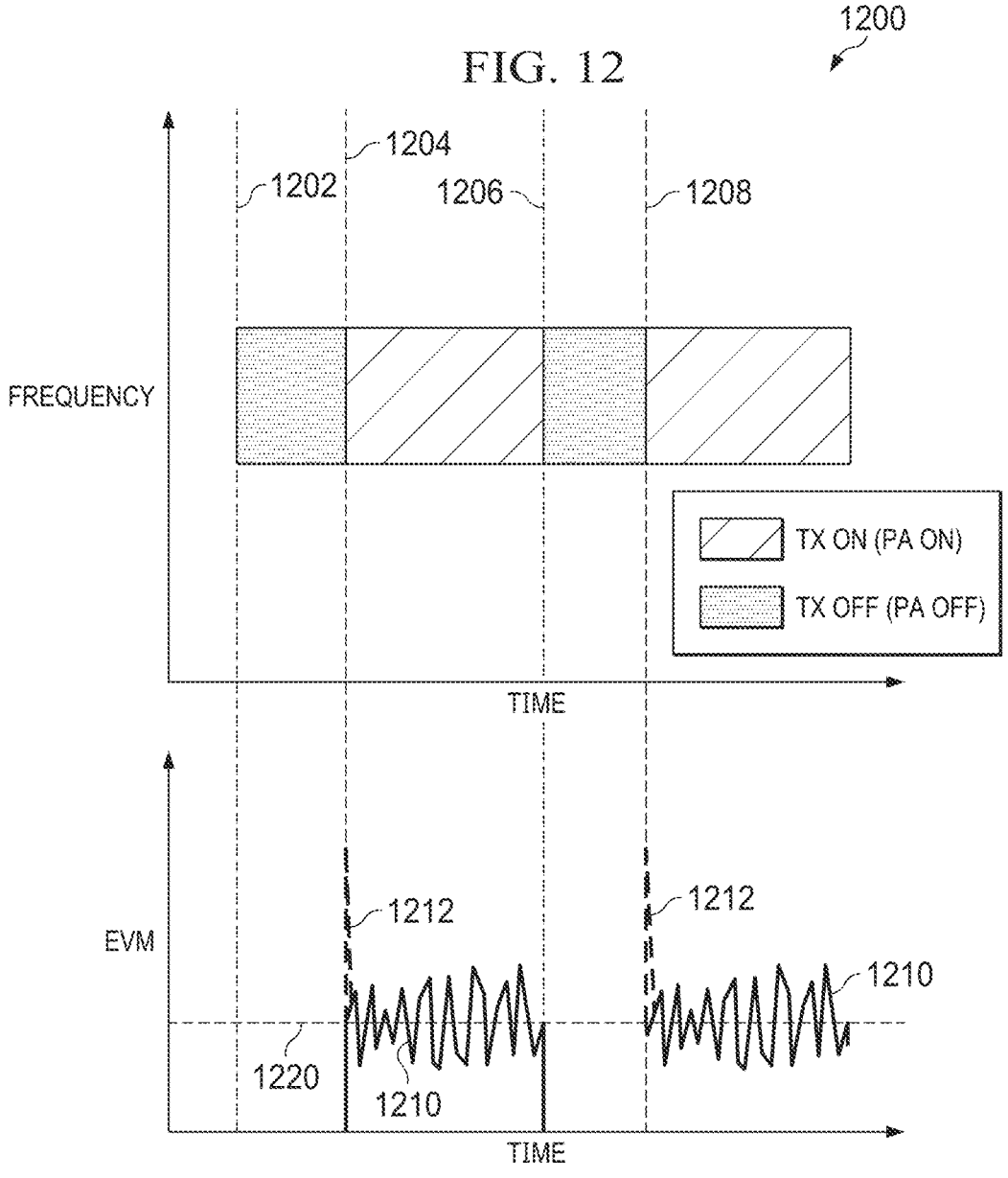
FIG. 12 is a waveform diagram illustrating an example error vector magnitude (EVM) in an example time division duplex (TDD) system over time.

FIG. 12 illustrates an example waveform 1200 of an EVM 1210 in a TDD system over time. The waveform 1200 may correspond to a Tx chain (e.g., 100, 200, etc.), as described throughout the present description.

As shown, the system alternates between Tx ON and Tx OFF, during which the PA is ON and OFF respectively. At a first point in time 1202, the system is in the Tx OFF state. At a second point in time 1204, the system transitions to the Tx ON state, causing the PA to turn ON. In the Tx ON state, the EVM 1210 fluctuates around an average EVM value 1220. At a third point in time 1206, the system transitions to the Tx OFF state, causing the PA to turn OFF. At a fourth point in time 1208, the system transitions to the Tx ON state, causing the PA to turn ON. Again, the EVM 1210 fluctuates around the average EVM value 1220.

Further illustrated is a hypothetical EVM 1212. The hypothetical EVM 1212 represents the EVM in the absence of the previously described DPD correction (e.g., by DPD circuitry 104). As shown, the hypothetical EVM 1212 experiences a transient when the system transitions from the Tx OFF to the Tx ON state (e.g., when the PA transitions from OFF to ON). For example, the transient occurs due to electron trapping/de-trapping effects, as previously described. As a result, the EVM 1212 is degraded for a time period immediately following the Tx OFF to Tx ON transition at the second point in time 1204 and the fourth point in time 1208. When considering a cellular communications system, the EVM 1212 could be degraded for multiple symbols in the time domain following the transition from Rx (e.g., Tx OFF) to Tx in TDD. In contrast, the EVM 1210 represents the EVM when DPD correction (e.g., by DPD circuitry 104) is applied. As shown, the DPD correction compensates for the transient effects, resulting in improved EVM during the time period immediately following the Tx OFF to Tx ON transitions.

Figure 13:
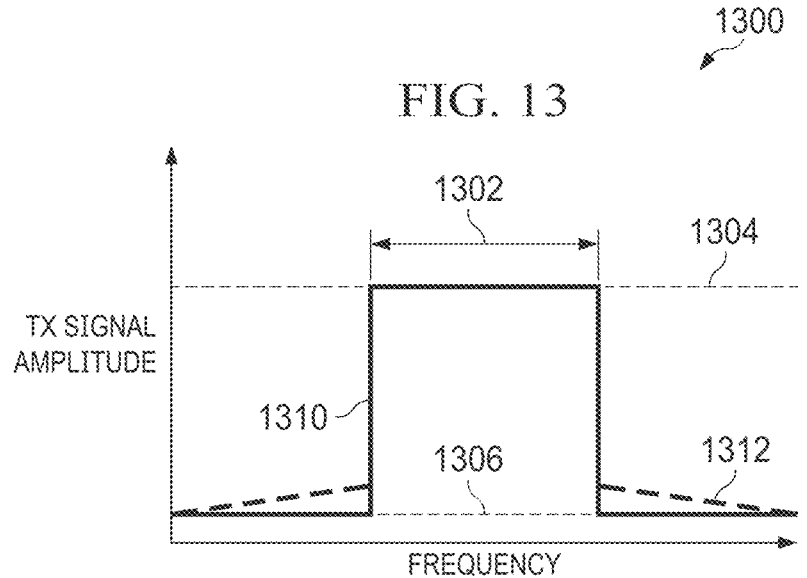
FIG. 13 is a waveform diagram illustrating an example Tx signal amplitude with respect to frequency.

FIG. 13 illustrates an example waveform 1300 of a Tx signal amplitude 1310 with respect to frequency. The waveform 1300 may correspond to a Tx chain including DPD circuitry (e.g., 104) and a signal capture circuit (e.g., 113), as described with reference to FIG. 1 and throughout the present description.

As shown, the Tx signal amplitude 1310 is a first value 1304 within a bandwidth 1302 of the frequency domain. Further, the Tx signal amplitude 1310 is a second value 1306 outside of a bandwidth 1302 (also referred to as a frequency band). The first value 1304 is greater than the second value 1306, such that the Tx signal amplitude 1310 is the largest within the bandwidth 1302.

Further illustrated is a hypothetical Tx signal amplitude 1312. The hypothetical Tx signal amplitude 1312 represents the Tx signal amplitude in the absence of the previously described DPD correction (e.g., by the DPD circuitry 104). As shown, the hypothetical Tx signal amplitude 1312 is greater than the Tx signal amplitude 1310 outside of the bandwidth 1302, which is also referred to as signal "leakage". For example, the signal leakage occurs due to electron trapping/de-trapping effects, as previously described. As a result, the ACLR is degraded for the hypothetical Tx signal, which can cause interference on adjacent frequency bands when transmitting the hypothetical Tx signal. In contrast, the Tx signal amplitude 1310 represents the Tx signal amplitude when DPD correction (e.g., by DPD circuitry 104) is applied. As shown, the DPD correction compensates for signal leakage due to electron trapping/de-trapping, resulting in improved ACLR.

Figure 14:
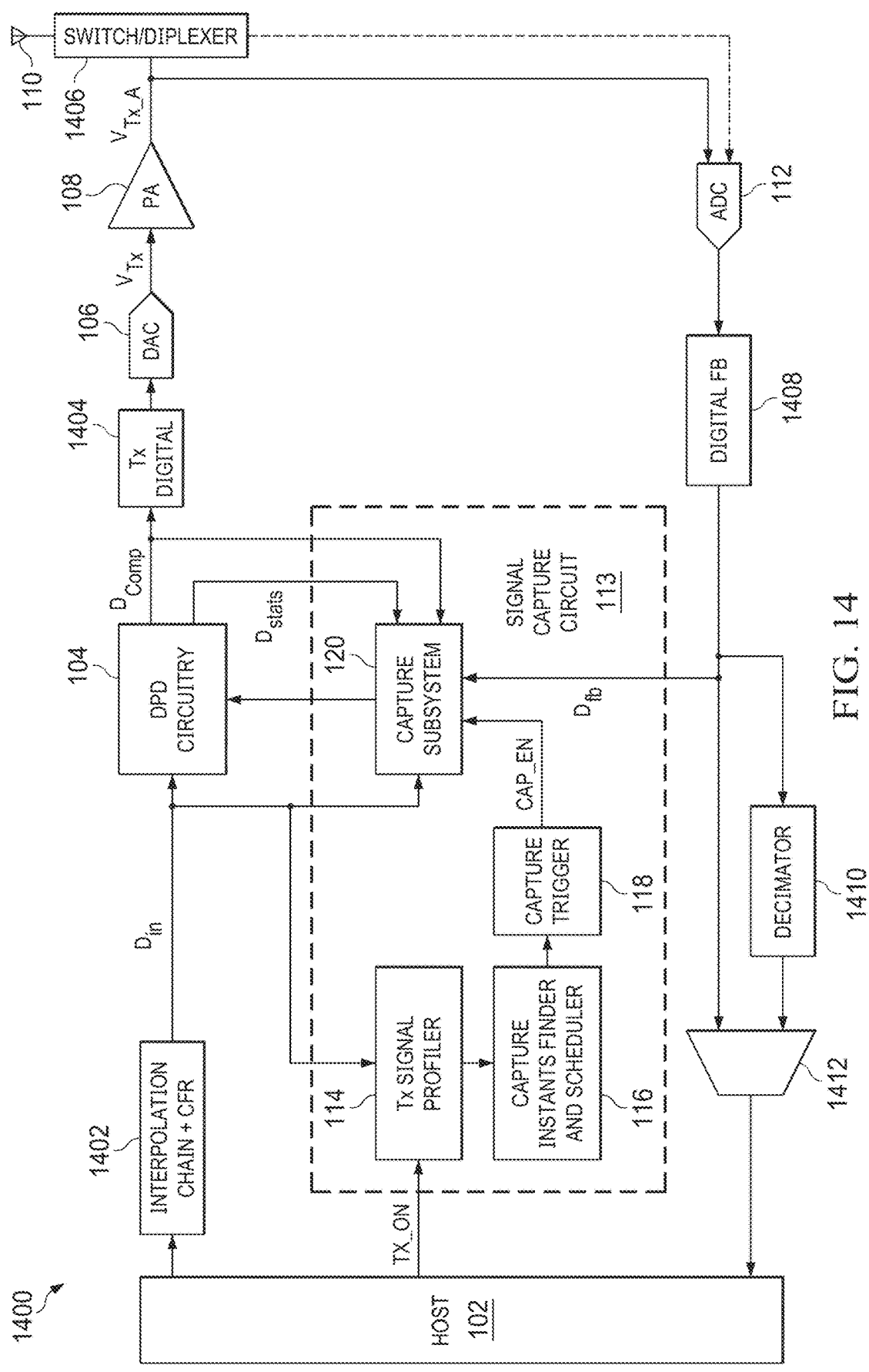
FIG. 14 is a block diagram illustrating an example variation of the Tx signal chain of FIG. 1.

FIG. 14 illustrates an example circuit 1400 of a Tx signal chain including the DPD circuitry 104. In some examples, the circuit 1400 is included in a base station. The circuit 1400 resembles the circuit 100 of FIG. 1, containing the elements of FIG. 1 and further including an interpolation chain 1402, Tx digital circuitry 1404, a switch/diplexer 1406, a digital feedback circuit 1408, a decimator 1410, and a multiplexer 1412.

FIG. 14 varies from FIG. 1 in that the interpolation chain 1402 has an input coupled to the first output of the HOST 102, and an output. The first input of the DPD circuitry 104 is coupled to the output of the interpolation chain 1402. The Tx digital circuitry 1404 has an input coupled to the first output of the DPD circuitry 104, and an output. The input of the DAC 106 is coupled to the output of the Tx digital circuitry 1404. The switch/diplexer 1406 has an input coupled to the output of the PA 108, and an output coupled to the antenna 110. The digital feedback circuit 1408 has an input coupled to the output of the ADC 112, a first output, and a second output. The decimator 1410 has an input and an output. The multiplexer 1412 has a first input, a second input, and an output coupled to the input of the HOST 102. The first input of the multiplexer 1412 is coupled to the first output of the digital feedback circuit 1408. The input of the decimator 1410 is coupled to the second output of the digital feedback circuit 1408, and the output of the decimator 1410 is coupled to the second input of the multiplexer 1412.

The interpolation chain 1402 performs interpolation (e.g., upsampling) on the Tx signal. Optionally, the interpolation chain 1402 may also perform Crest Factor Reduction (CFR) on the Tx signal. In the example of FIG. 14, the HOST 102 and the interpolation chain 1402 are illustrated as separate elements. However, in alternative examples the interpolation chain 1402 is included within the HOST 102, such that the HOST 102 further performs the operations of the described interpolation chain 1402.

The Tx digital circuitry 1404 performs digital signal processing on the signal received on the input of the Tx digital circuitry 1404, for example, IQ modulation, etc. The Tx digital circuitry 1404 provides the processed digital signal at the output of the Tx digital circuitry 1404 to the DAC 106, which converts the signal to an analog signal. The DAC 106 provides the analog signal at the output of the DAC 106 to the PA 108, which amplifies the signal. In some examples, the switch/diplexer 1406 includes a switch, which switches between Tx and Rx during TDD operation. In alternative examples, the switch/diplexer 1406 includes a diplexer, which is used to isolate Tx and Rx signals during FDD operation. In both examples, the switch/diplexer 1406 provides the signal to the antenna 110 for transmission (e.g., over an air interface).

In some examples, the switch/diplexer 1406 additionally has an output coupled to an input of the ADC 112 (illustrated by the dashed line). In such examples, the ADC 112, the digital feedback circuit 1408, the decimator 1410, and/or the multiplexer 1412 may act as an Rx chain to process signals received via the antenna 110, for example, during Rx operation in TDD. Further, during Tx operation in TDD, the ADC 112, the digital feedback circuit 1408, the decimator 1410, and/or the multiplexer 1412 may be used to process feedback from the PA 108.

In alternative examples, the ADC 112, the digital feedback circuit 1408, the decimator 1410, and/or the multiplexer 1412 are used to process feedback from the PA 108 only, and separate circuitry (not shown) is used for processing Rx signals received via the antenna 110. For example, since Tx and Rx may occur simultaneously in FDD, separate circuitry is used for processing feedback from the PA 108 and Rx signals received via the antenna 110.

The ADC 112 converts the analog signal received on the input of the ADC 112 to a digital signal, which is provided at the output of the ADC 112. The digital feedback circuit 1408 performs digital signal processing on the signal output by the ADC 112 which includes, for example, down-converting the signal by the carrier frequency. The decimator 1410 downsamples a signal received on the input of the decimator, and provide the downsampled signal at the output of the decimator. The multiplexer 1412 selects a signal from the first and second inputs of the multiplexer 1412 to be provided at the output of the multiplexer 1412 to the HOST 102. Although not shown, the multiplexer 1412 may include a control input to control selection between the first and second inputs. In some examples, the control input of the multiplexer 1412 is coupled to the HOST 102. By controlling the multiplexer 1412, the HOST 102 can select between a higher sample rate (e.g., from the digital feedback circuit 1408) or a lower sample rate (e.g., from the decimator 1410) of the feedback signal from the PA 108, depending on the needs of the HOST 102.

In some examples, the DPD circuitry 104, Tx digital circuitry 1404, and DAC 106 are included on a same chip. In a further example, the signal capture circuit 113 is included on the same chip as the DPD circuitry 104. In a further example, the HOST 102 and the PA 108 are on different chips than the chip including the DPD circuitry 104 and the DAC 106. The interpolation chain 1402 may be included on the same chip or a different chip than the chip including the DPD circuitry 104 and the DAC 106.

Also, the DAC 106, PA 108, switch/diplexer 1406, antenna 110, and ADC 112 are implemented in analog circuitry. In an example, the DPD circuitry 104, the interpolation chain 1402, the Tx digital circuitry 1404, the digital feedback circuit 1408, the decimator 1410, the multiplexer 1412, and the signal capture circuit 113 are constructed using digital logic circuitry including combinations of logic gates. In another example, one or more of the DPD circuitry 104, the interpolation chain 1402, the Tx digital circuitry 1404, the digital feedback circuit 1408, the decimator 1410, the multiplexer 1412, and the signal capture circuit 113 are included in or implemented by a DSP. In another example, one or more of the DPD circuitry 104, the interpolation chain 1402, the Tx digital circuitry 1404, the digital feedback circuit 1408, the decimator 1410, the multiplexer 1412, and the signal capture circuit 113 are implemented by a processor executing software.

The methods are illustrated and described above as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases. In some examples, the methods described above may be implemented in a computer readable medium using instructions stored in a memory.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor, a bipolar junction transistor (BJT—e.g. NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. Also, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of that parameter. Modifications are possible in the described examples, and other implementations are possible, within the scope of the claims.

What is claimed is:

1. A circuit comprising:
   a capture subsystem configured to capture a set of signal samples responsive to a capture enable signal;
   digital pre-distortion (DPD) circuitry configured to:
       generate a signal statistics signal based on an input signal;
       generate a set of DPD coefficients based on the set of signal samples, wherein the set of signal samples includes samples of the signal statistics signal; and
       apply DPD correction to the input signal to produce an output signal based on the signal statistics signal and the set of DPD coefficients;
   a transmit (Tx) signal profiler configured to monitor the input signal and a Tx ON signal; and
   a capture instants finder and scheduler coupled to the Tx signal profiler and configured to provide the capture enable signal based on the monitoring of the input signal and the Tx ON signal.

2. The circuit of claim 1, wherein the set of signal samples further includes samples of: the input signal, the output signal, and an output feedback signal based on feedback from the output signal.

3. The circuit of claim 2, wherein the DPD circuitry is configured to generate the signal statistics signal based on a state dependent dual time constant filter or a moving average filter.

4. The circuit of claim 1, wherein the capture subsystem is configured to store the captured set of signal samples in a memory of the capture subsystem.

5. A circuit comprising:
digital pre-distortion (DPD) circuitry configured to apply, based on a set of DPD coefficients, DPD correction to an input signal received on an input of the DPD circuitry to produce an output signal at an output of the DPD circuitry;
a signal capture circuit, including:
a transmit (Tx) signal profiler coupled to the input of the DPD circuitry and configured to monitor the input signal;
a capture instants finder and scheduler coupled to the Tx signal profiler and configured to provide a capture enable signal based on the monitoring of the input signal; and
a capture subsystem coupled to the capture instants finder and scheduler and configured to capture samples of a set of signals responsive to the capture enable signal;
wherein the DPD circuitry includes:
a DPD estimator coupled to the capture subsystem and configured to generate the set of DPD coefficients based on the captured samples; and
a signal statistics circuit configured to generate a signal statistics signal based on the input signal, wherein the set of signals includes the signal statistics signal.

6. The circuit of claim 5, wherein the capture subsystem includes memory circuitry coupled to the capture instants finder and scheduler and configured to store the captured samples.

7. The circuit of claim 5, wherein the Tx signal profiler includes a frame duration counter configured to reset according to a frame periodicity.

8. The circuit of claim 7, wherein the Tx signal profiler further includes:
a sub-block power computation circuit coupled to the frame duration counter and configured to compute a power of the input signal over a sub-block duration; and
a storage module configured to store the computed power of the input signal over the sub-block duration and a frame duration counter value associated with the computed power of the input signal over the sub-block duration.

9. The circuit of claim 8, wherein the Tx signal profiler further includes a Tx state transition log coupled to the frame duration counter and configured to record a Tx state transition and a frame duration counter value associated with the Tx state transition.

10. The circuit of claim 9, wherein the capture instants finder and scheduler includes a block power computation circuit configured to compute a power of the input signal over a block duration greater than the sub-block duration based on a plurality of sub-block powers stored in the storage module.

11. The circuit of claim 10, wherein the block duration is approximately equal to an orthogonal frequency division multiplexing (OFDM) symbol duration associated with a configured sub-carrier spacing (SCS).

12. The circuit of claim 10, wherein the capture instants finder and scheduler further includes:
a power transition finder coupled to the block power computation circuit;
a symbol power finder coupled to the block power computation circuit;
a Tx state transition finder coupled to the Tx state transition log; and
a capture instants aggregator configured to prune and aggregate capture instants received from the power transition finder, the symbol power finder, and the Tx state transition finder to produce a set of scheduled capture instants;
wherein the circuit further includes a capture trigger configured to provide the capture enable signal based the scheduled capture instants and the frame duration counter.

13. The circuit of claim 12, wherein the power transition finder is configured to provide capture instants to the capture instants aggregator based on a comparison between a power ratio between blocks and one or more of: a high-to-lower power transition ratio and a low-to-high power transition ratio.

14. The circuit of claim 12, wherein the symbol power finder is configured to:
categorize the block powers into a plurality of power sub-ranges; and
provide capture instants to the capture instants aggregator based on the categorization of the block powers into the plurality of power sub-ranges and a predetermined number of captures in each power sub-range.

15. The circuit of claim 14, wherein the symbol power finder is further configured to sort the block powers in descending order of power within each power sub-range.

16. The circuit of claim 12, wherein the Tx state transition finder is configured to provide capture instants to the capture instants aggregator based on recorded transitions in the Tx state transition log, a predetermined number of captures, and a predetermined time offset from each transition.

17. The circuit of claim 12, wherein the capture trigger is configured to provide the capture enable signal further based on a processing slack time.

18. The circuit of claim 5, wherein the set of signals further includes the input signal, the output signal, and an output feedback signal based on feedback from the output signal.

19. The circuit of claim 3, wherein the capture subsystem is configured to store the captured set of signal samples in a memory of the capture subsystem.

20. An apparatus comprising:
digital pre-distortion (DPD) circuitry configured to apply, based on a set of DPD coefficients, DPD correction to an input signal received on an input of the DPD circuitry to produce an output signal at an output of the DPD circuitry;
a signal capture circuit, including:
a transmit (Tx) signal profiler coupled to the input of the DPD circuitry and configured to monitor the input signal;
a capture instants finder and scheduler coupled to the Tx signal profiler and configured to provide a capture enable signal based on the monitoring of the input signal; and a capture subsystem coupled to the capture instants finder and scheduler and configured to capture samples of a set of signals responsive to the capture enable signal;

a digital to analog converter (DAC) having an input coupled to the output of the DPD circuitry and an output;

a power amplifier having an input coupled to the output of the DAC and an output; and an analog to digital converter (ADC) having an input coupled to the output of the power amplifier and an output coupled to the capture subsystem;

wherein the DPD circuitry includes:

a DPD estimator coupled to the capture subsystem and configured to generate the set of DPD coefficients based on the captured samples; and a signal statistics circuit configured to generate a signal statistics signal based on the input signal;

wherein the set of signals includes the input signal, the output signal, an output feedback signal received from the output of the ADC, and the signal statistics signal.

21. A circuit comprising:

digital pre-distortion (DPD) circuitry having an input;

a signal capture circuit, including:

a transmit (Tx) signal profiler coupled to the input of the DPD circuitry;

a capture instants finder and scheduler coupled to the Tx signal profiler; and a capture subsystem coupled to the capture instants finder and scheduler.

22. The circuit of claim 21, wherein the DPD circuitry includes a DPD estimator coupled to the capture.

23. The circuit of claim 21, wherein the capture subsystem includes memory circuitry coupled to the capture instants finder and scheduler.

24. The circuit of claim 21, wherein the Tx signal profiler includes a frame duration counter.

25. The circuit of claim 24, wherein the Tx signal profiler further includes:

a sub-block power computation circuit coupled to the frame duration counter; and a storage module.

26. The circuit of claim 25, wherein the Tx signal profiler further includes a Tx state transition log coupled to the frame duration counter.

27. The circuit of claim 23, wherein the capture instants finder and scheduler includes a block power computation circuit.

28. The circuit of claim 24, wherein a frame duration of the frame duration counter is approximately equal to a duration of a cellular frame.

29. The circuit of claim 27, wherein the capture instants finder and scheduler further includes:

a power transition finder coupled to the block power computation circuit;

a symbol power finder coupled to the block power computation circuit;

a Tx state transition finder coupled to the Tx state transition log; and a capture instants aggregator.

* * * * *